United States Patent [19]

Fukuda et al.

[11] Patent Number: 4,548,777
[45] Date of Patent: Oct. 22, 1985

[54] METHOD OF MANUFACTURING INFORMATION STORAGE MEDIUMS

[75] Inventors: Tomeichiro Fukuda, Yokohama; Takashi Soda, Tokyo; Ikuo Furukawa; Takushi Hayashi, both of Sagamihara; Fujio Kumata, Tokyo; Susumu Nagano, Yokosuka, all of Japan

[73] Assignee: Victor Company of Japan, Limited, Japan

[21] Appl. No.: 367,225

[22] Filed: Apr. 9, 1982

[30] Foreign Application Priority Data

Apr. 10, 1981 [JP] Japan .................................. 56-54168

[51] Int. Cl.⁴ .......................................... B29D 17/00
[52] U.S. Cl. .................................... 264/107; 156/267; 156/530; 264/328.11; 425/145; 425/467; 425/577
[58] Field of Search ............... 425/810, 145, 460, 466, 425/467, 469, 470, 574, 577; 264/106, 107, 328.7, 77, 328.11; 249/82; 156/267, 530

[56] References Cited

U.S. PATENT DOCUMENTS

| | | | |
|---|---|---|---|
| 1,560,368 | 11/1925 | Bartels et al. | 264/77 |
| 3,186,029 | 6/1965 | Joseph | 264/107 |
| 3,412,427 | 11/1968 | Flusfeder et al. | 264/107 |
| 3,543,331 | 12/1970 | Rand et al. | 425/144 |
| 3,662,051 | 5/1972 | Harlow et al. | 264/107 |
| 3,889,563 | 6/1975 | Westermann | 425/810 |
| 3,937,779 | 2/1976 | Simmons | 264/106 |
| 4,005,965 | 2/1977 | Roczynski et al. | 425/810 X |
| 4,034,033 | 7/1977 | Carrere | 264/106 |
| 4,064,674 | 12/1977 | Palmer | 425/810 X |
| 4,243,456 | 1/1981 | Cesano | 156/267 |
| 4,281,816 | 8/1981 | Carroll et al. | 424/810 X |
| 4,327,047 | 4/1982 | McNeely | 425/810 X |
| 4,380,484 | 4/1983 | Repik et al. | 156/530 |

FOREIGN PATENT DOCUMENTS

| | | | |
|---|---|---|---|
| 531362 | 9/1955 | Belgium | 425/577 |
| 1050603 | 12/1966 | United Kingdom | 264/106 |

Primary Examiner—Jay H. Woo
Assistant Examiner—Timothy W. Heitbrink
Attorney, Agent, or Firm—Lowe, King, Price & Becker

[57] ABSTRACT

Information storage mediums such as video discs and digital audio discs are fabricated by extruding a mass of electrically conductive synthetic resin into a block assembly composed of a pair of separable blocks in which the mass is molded into a cake that is then carried by one of the blocks as separated into a press in which the cake is pressed into an information storage medium or disc blank. The blank is transferred into a trimmer for trimming an overflow off the disc blank as an annular scrap, which is in turn chopped by a chopper into pieces for reuse. A disc from which the scrap has been removed is fed to a hot stamping machine in which an identification foil piece is attached with heat to the disc. The disc with the foil piece stamped thereon is punched to form a central hole by a punching machine. A predetermined number of such finished discs are stacked on a pallet in a stacker, with partition plates alternating with groups of such piled discs, and the pallet loaded with the discs is discharged from the stacker.

8 Claims, 38 Drawing Figures

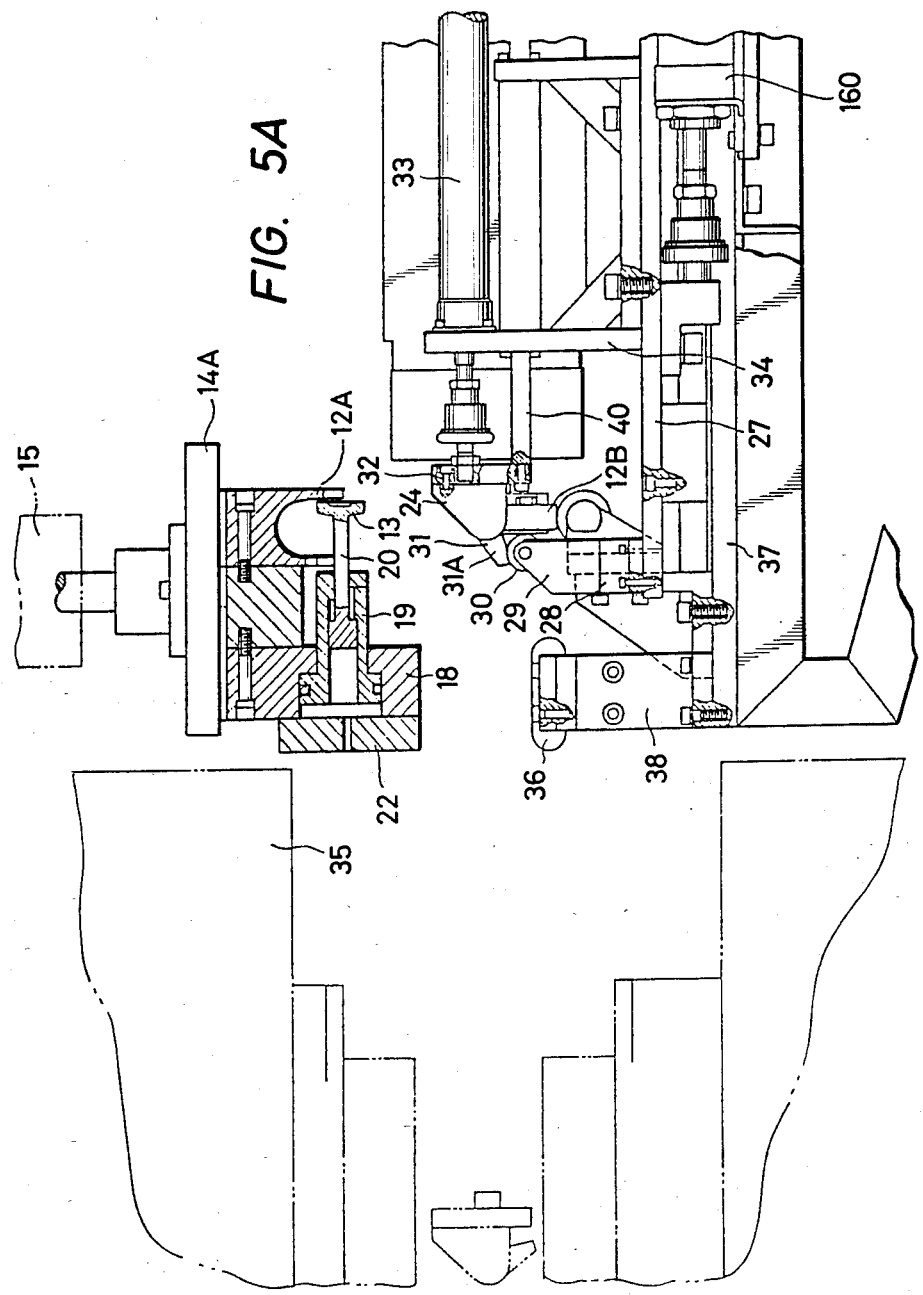

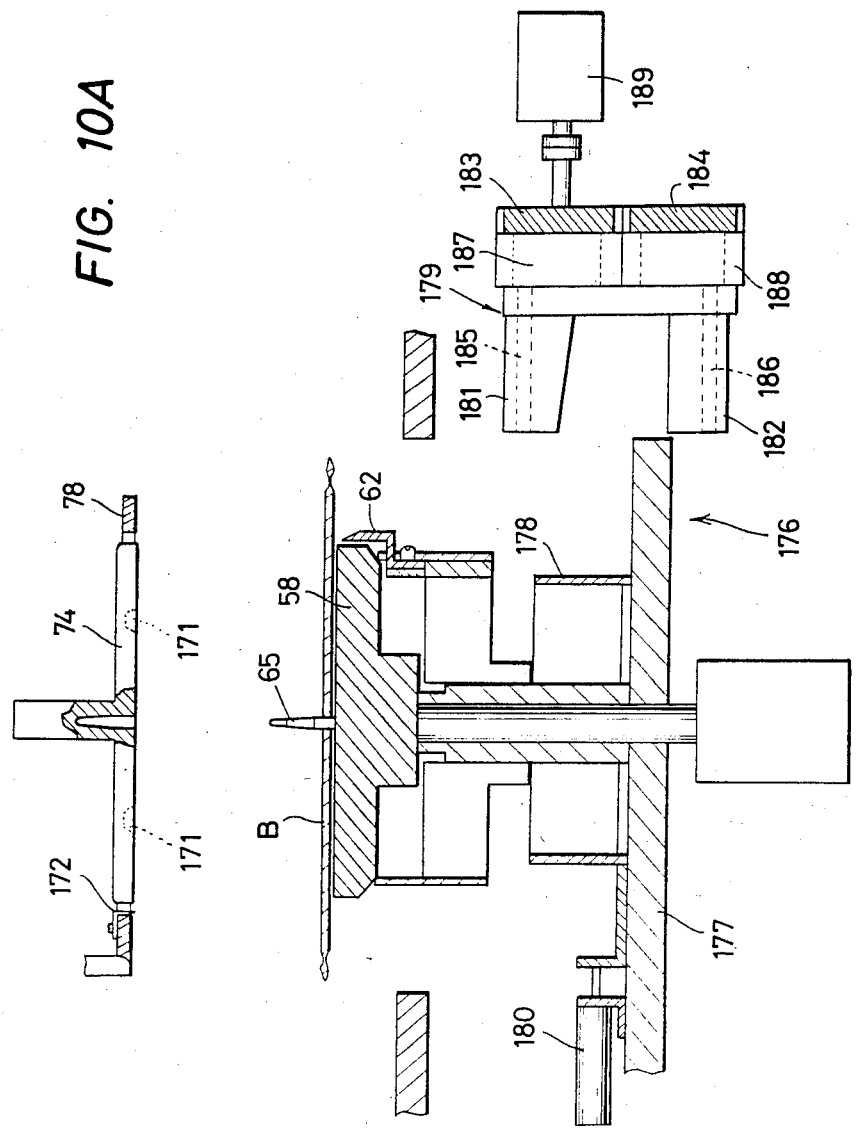

METHOD OF MANUFACTURING INFORMATION STORAGE MEDIUMS

BACKGROUND OF THE INVENTION

The present invention relates to an apparatus for and a method of manufacturing information storage mediums such as video discs or digital audio discs in which vast amounts of information are recorded per unit area of the disc.

It is customary practice to fabricate phonograph records or discs by feeding a pair of spaced record labels into an extruding machine, extruding a mass of synthetic resin between the record labels into a pancake or biscuit, and then transferring the pancake to a press in which it is pressed into a disc with sound grooves cut thereon.

Video discs containing both video and audio information are in the form of a flat circular plate, typically about 26 cm across, made of vinyl chloride which is rendered electrically conductive by being mixed with 5% to 30% by weight of carbon. The video disc has on each of its surfaces a spiral track containing a series of depressions or pits written by frequency-modulated signals, with adjacent track convolutions or turns being closely spaced as at a pitch of 1.35 $\mu$m. The information can be read out of the spiral track by picking up variations in electrostatic capacity produced between the pits and a diamond needle having a metal film electrode which traces the spiral track as the disc rotates at a high speed of 900 revolutions per minute.

The video discs differ widely from the phonograph records in that the video discs contain a great amount of video and audio information recorded at an extremely high density. Many uses and applications which have been, and will be, found by the video discs especially for the development of educational and cultural aspects of life would certainly benefit from mass production of video discs of high quality.

SUMMARY OF THE INVENTION

It is an object of the present invention to provide an apparatus for mass-producing information storage mediums containing a great amount of information at a high density, such as video discs and digital audio discs.

Another object of the present invention is to provide a method of mass-producing such information storage mediums.

Still another object of the present invention is to provide a method of manufacturing information storage mediums, such as video discs, which are substantially free from mechanical distortions which could adversely affect the information recorded on the mediums.

A still further object of the present invention is to provide an apparatus for reducing the above method into practice.

According to the present invention, a mass of synthetic resin is extruded from an extruder into a cup or block assembly in which the mass is molded into a cake, which is then fed into a press. While the cake is being molded, a tip of the mass of synthetic resin which comes out first of the extruder is held centrally in the block assembly by a recessed plate that is retractable through and out of the block assembly as the mass of synthetic resin enters the block assembly. The tip of the extruded mass, which is positioned centrally of the cake, is eventually punched out and discarded. The mold assembly is heated during the molding operation to smooth and uniformize the surface of the cake, heat the cake surface uniformly, and soften the cake. The cake is placed between a pair of press dies which can be heated and cooled alternately with steam and water passing through grooves or channels in the press dies, and pressed thereby into an information storage medium or disc blank having a recorded region, an unrecorded region, and an overflow or flash which are contiguous radially to each other. The press dies are heated and cooled in a manner to uniformize the heating of the recorded region and to allow distortions or flaws to concentrate in the unrecorded region and overflow, which will finally be trimmed off. While the disc blank is being formed, it is retained jointly by a pair of centering pins retractably supported on the press dies, respectively, and is pierced thereby before the pressing operation is over.

The disc blank is then transferred onto a turntable so as to be sandwiched between the turntable and a pressure table, whereupon the unrecorded region and overflow is severed off the recorded region by a cutter blade that is moved gradually across or passes by the edge of the turntable. The unrecorded region and overflow is cut off as an annular scrap which is chopped into pieces by a pair of cutter blades movable toward and away from each other as they rotate to sever the annular scrap successively into pieces for reuse. The disc which is composed of the recorded region is fed into a hot stamping machine in which the disc is provided with a heat applied identification film or foil. The disc is then delivered to a punching machine on which a large-diameter hole is centrally punched through the disc. The press, the trimmer, the hot stamping machine, and the punching machine are spaced at equal intervals along the direction in which the disc blank and the disc are processed and manufactured. The disc blank is transferred from the press to the trimmer by a pair of gripper arms connected to a slide movable along the direction of processing and having a disc pickup means, the gripper arms having a length equal to the interval between the press and the trimmer. A support arm which has a disc pickup means at one end is connected at the other end to the slide and extends remotely from the gripper arms, the support arm being of a length equal to the interval between the trimmer and the hot stamping machine, or the hot stamping machine and the punching machine. Disc blanks and discs can be transferred one at a time along the direction of processing thereof by the gripper arms, the slide, and the support arms. The discs which are successively fabricated are placed one by one onto a pallet, with partition plates inserted between groups of the stacked discs, and the pallet carrying a predetermined number of discs is discharged down an inclined discharge table.

The above and other objects, features and advantages of the present invention will become more apparent from the following description when taken in conjunction with the accompanying drawings in which certain preferred embodiments are shown by way of illustrative example.

BRIEF DESCRIPTION OF THE DRAWINGS

FIG. 5A is a side elevational view of a cake molding machine;

FIG. 10A is a vertical cross-sectional view, partly shown in elevation, of a chopper mechanism for chopping a severed annular scrap;

DETAILED DESCRIPTION

Figure 1:
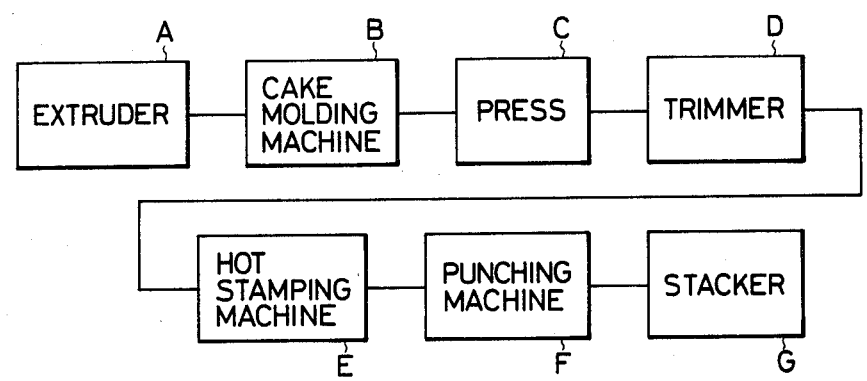
FIG. 1 is a block diagram showing an array of successive components of an apparatus for manufacturing information storage mediums in accordance with the present invention.

FIG. 1 shows a series of components or machines for effecting successive operations for fabricating information storage mediums such as video discs or digital audio discs. A mass of synthetic resin containing 5% to 30% by weight of carbon for electrical conductivity is extruded by an extruder A into a cake molding machine B in which the extruded mass of resin is molded into a disc cake. The disc cake is transferred into a press C so as to be pressed by a pair of press dies into an information storage medium or disc blank having a recorded region, an unrecorded region, and an overflow or flash which are contiguous to each other. The unrecorded region and overflow is trimmed off by a trimmer D, and the disc composed of the recorded region is fed into a hot stamping machine E wherein an identification foil is applied to the disc. A large-diameter hole is defined centrally through the disc by a punching machine F. Discs thus manufactured one by one are stacked onto a pallet in a stacker G, with groups of the discs alternating with partition plates, and are discharged down a discharge table.

Figure 3:
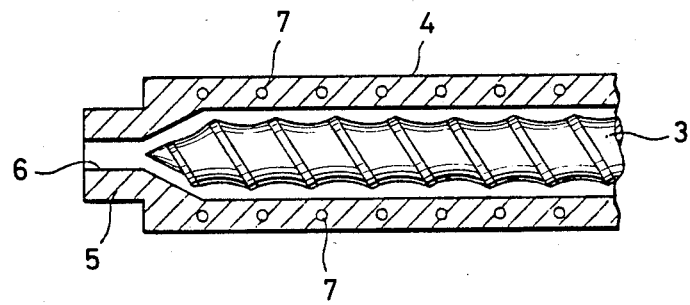
FIG. 3 is a longitudinal cross-sectional view of an extruder having an extruding nozzle.
Figure 2A:
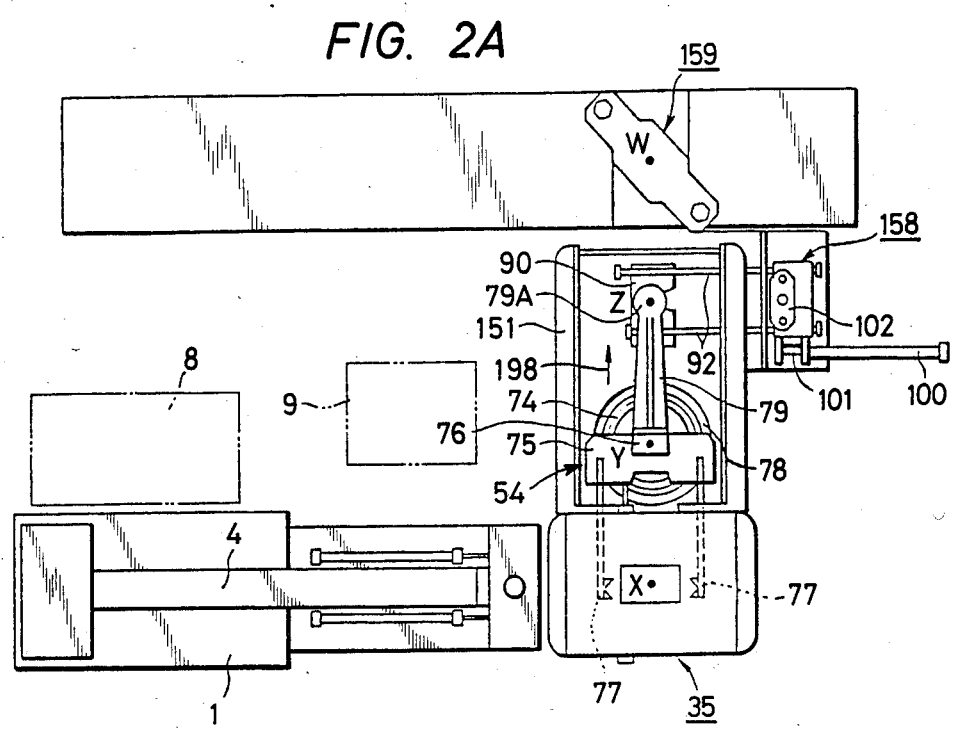
FIGS. 2A through 2D are plan, front elevational, side elevational, and rear views, respectively, of the apparatus according to the present invention.
Figure 2B:
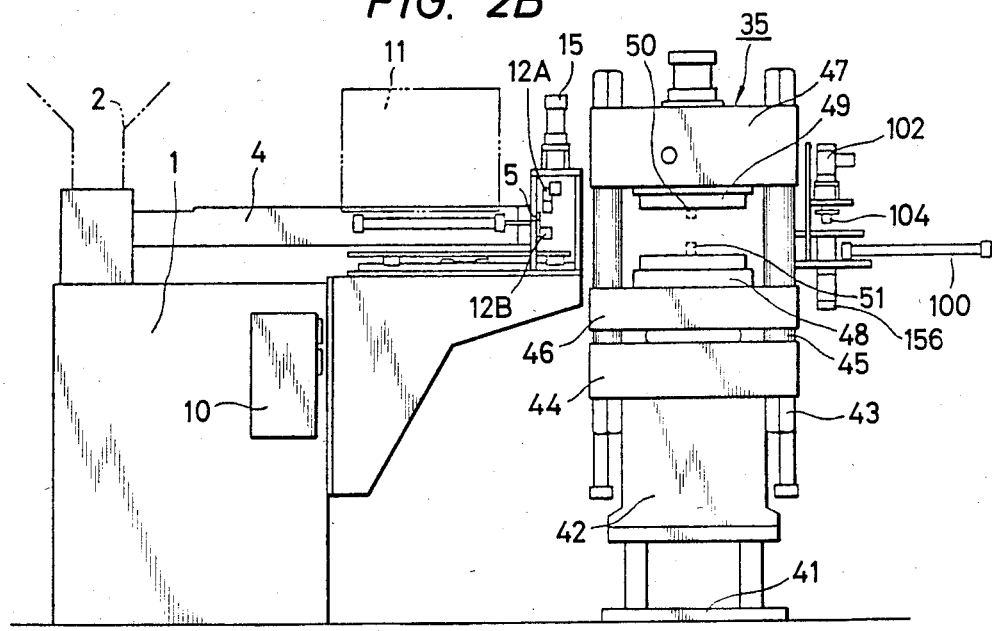

As illustrated in FIGS. 2A and 2B, an extruder 1 includes a hopper 2 through which a mixture of synthetic resin such as vinyl chloride and carbon is supplied from a supply means (not shown) into a cylinder 4 (FIG. 3) coupled to the hopper 2. The cylinder 4 has therein a screw 3 rotatable about its own axis to extrude the material fed from the hopper 2 through a hole 6 in an extruding nozzle 5 disposed at one end of the cylinder 4. The cylinder 4 also includes passageways 7 for circulation therethrough of steam to heat the material in the cylinder 4 up to a temperature ranging from 100 degrees to 200 degrees Celsius for keeping the material melted upon extrusion.

In FIGS. 2A and 2B, the appatratus has a control panel 8 for controlling electrical inputs and outputs, an air manifold valve unit 9 including solenoid-operated valves and others for actuating various air cylinders, a control box 10 for setting temperatures of the extruder 1 and controlling a motor for driving the extruder 1, and a control panel 11 controlling all operations of a press.

The material fed through the hopper 2 is kneaded by the screw 3 in the cylinder 4 to a viscosity suitable for molding as the material is extruded through the hole 6 in the nozzle 5. An extruded mass of such material, which is of an amount enough for forming one information storage medium or disc, is supplied into a cake molding machine disposed adjacent to the extruder 1.

Figure 4A:
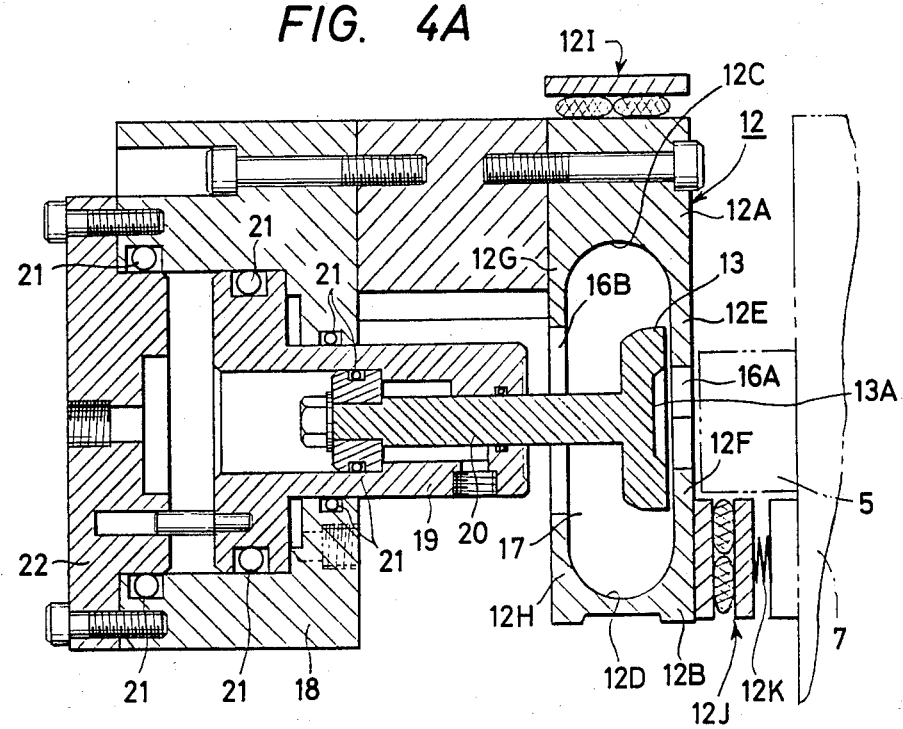
FIG. 4A is an enlarged cross-sectional view of a cup or block assembly for molding a disc cake.

As shown in FIG. 4A, the cake molding machine comprises a cup or block assembly 12 composed of separable upper and lower cups or blocks 12A, 12B having recesses 12C, 12D, respectively, which jointly define a mold cavity 17 that is substantially circular in cross section. The upper and lower cups 12A, 12B include a pair of first extension walls 12 E, 12F, respectively, facing the extruding nozzle 5, and a pair of second extension walls 12G, 12H spaced from the first extension walls 12E, 12F. The upper and lower cups 12A, 12B are mounted respectively on upper and lower supports 14A, 14B (FIGS. 5A and 6). The upper support 14A is coupled to a fluid-pressure actuator or an air cylinder 15, as shown in FIG. 5A. When the air cylinder 15 is actuated to lower the support 14A, the upper cup 12A is moved downwardly until it is coupled with the lower cup 12B to form the block assembly 12. The block assembly 12 thus assembled has first and second openings 16A, 16B defined respectively in the first extension walls 12E, 12F and the second extension walls 12G, 12H. The first opening 16A is located in confronting relation to the extruding nozzle 5 and is of a circular configuration having a diameter of about 20 mm. The second opening 16B is spaced in concentric relation from the first opening 16A and is also circular with its diameter being about 30 mm.

A circular plate 13 is supported on a piston rod 20 telescopically disposed in a fluid cylinder or air cylinder 19 and is disposed retractably in the mold cavity 17. The circular plate 13 has a central recess 13A in its face confronting the nozzle 5 through the first opening 16A. The central recess 13A is substantially coextensive and axially aligned with the first opening 16A. The circular plate 13 has a diameter which is substantially the same as or smaller than the diameter of the second opening 16B. The air cylinder 19 is slidably received in another air cylinder 18 which is mounted on the support 14A, the air cylinder 18 being closed off by a flange 22. The air cylinders 18, 19 and the piston rod 20 have various O rings 21 serving as airtight seals.

The recess 13A in the circular plate 13 serves to hold a tip of the material extruded from the nozzle 5 as the plate 13 is retracted away from the first opening 16A, while permitting the remainder of the extruded material to spread into and fill the mold cavity 17. The tip of the extruded mass is kept at all times centrally of a disc cake molded in the mold cavity 17, and will eventually be punched out as described later on. Such final removal of the tip of the extruded material is preferable since the tip of the material is exposed as it starts being extruded and hence tends to trap or engulf dust particles or foreign matter. More specifically, the front tip of the extruded material which comes out first of the extruder 1 is first cooled down to the room temperature and becomes first harder than the rest of the mass extruded from the extruder 1. Such a hard tip is centrally located or contained in the core portion of the cake, and is prevented from going into the recorded region when the cake is pressed into a disc. The central portion of the disc will finally be punched out. Therefore, the disc is free from undesirable mechanical distortions which could be caused by the tip of the extruded mass. The circular plate 13, however, may have a flat face as a tip of extruded mass is apt to adhere to the flat face of the circular plate and to be held thereby without spreading into the other portion than the axial central portion of the mold cavity 17.

As shown in FIGS. 5A and 6, the lower support 14B is mounted swingably on a pair of shafts 23, 23 fixed to a pair of arms 24, 24, respectively, of a mounting plate 32 secured to a fluid-pressure actuator 33 such as an air cylinder. A slide base 27 on which the air cylinder 33 is mounted by a bracket 34 is drivable by another fluid cylinder or air cylinder 160 mounted on a base 37, the slide 27 supporting thereon brackets 28, 29. A roller 30 is rotatably mounted on the bracket 29. The lower support 14B has a cam follower 31 affixed thereto and having a distal end 31A engageable with the roller 30. The lower support 14B is normally urged to turn counterclockwise (as viewed in FIG. 5A) about the shafts 23 under the bias of torsion springs 25, 25 acting between the mounting plate 32 and the lower support 14B.

Figure 5B:
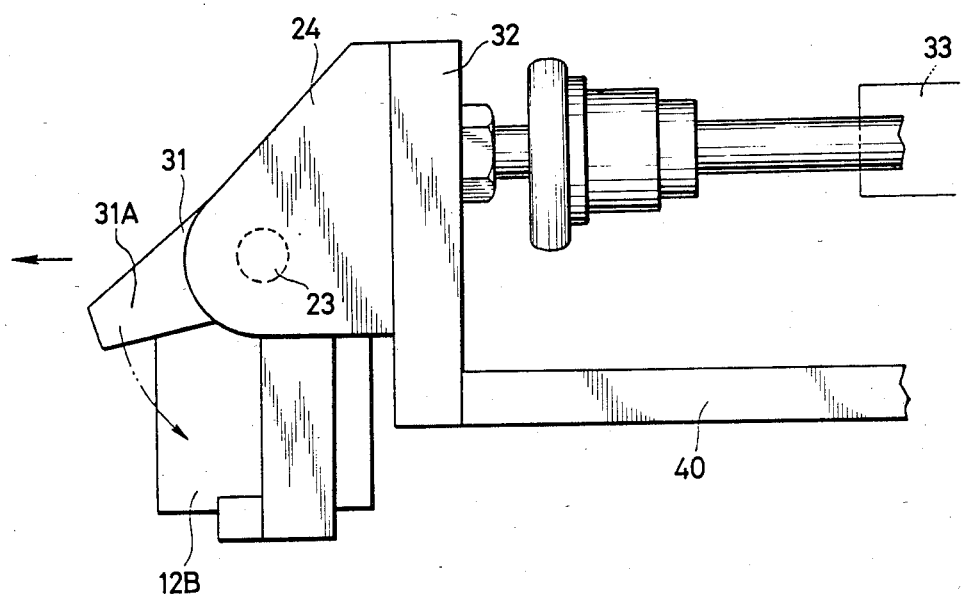
FIG. 5B is an enlarged side elevational view of a portion of the cake molding machine illustrated in FIG. 5A.
Figure 6:
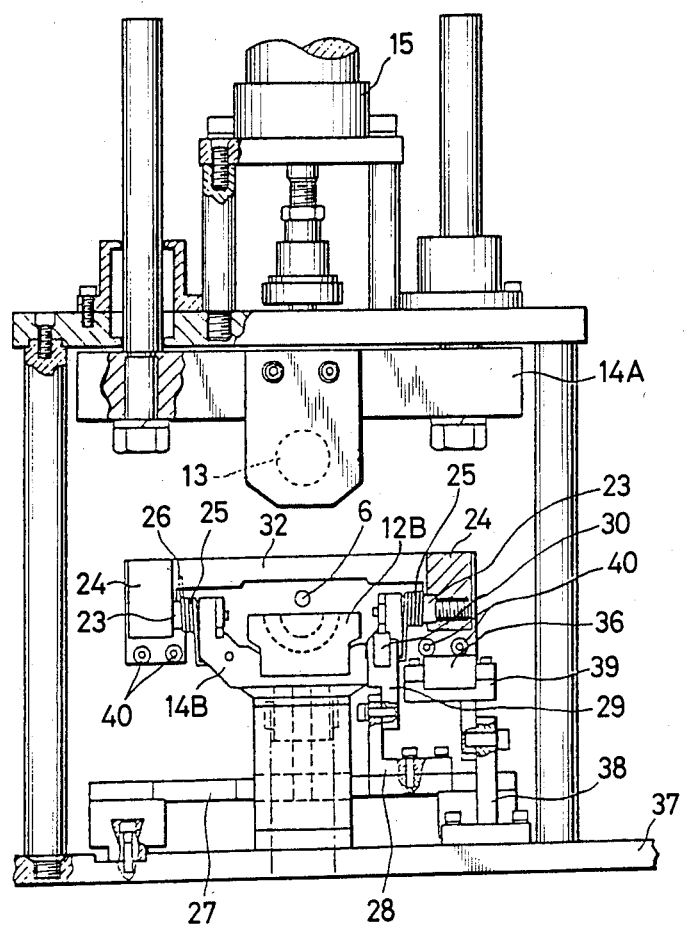
FIG. 6 is a front elevational view of the cake molding machine.

After the air cylinder 160 has been actuated to move the slide base 27 from the position shown in FIG. 5A to the left toward a press 35 (FIG. 5A) by a predetermined distance (say, about 50 mm), the air cylinder 33 is actuated to push the mounting plate 32 forward, whereupon the cam 31 is caused to turn counterclockwise (FIGS. 5A and 5B) under the force of the springs 25 and at the same time the lower support 14B is also caused to swing in the counterclockwise direction. As the mounting plate 32 advances further, the cam 31 is finally brought out of engagement with the roller 30. When the cam 31 is completely disengaged from the roller 30, the lower cup 12B that is mounted on the lower support 14B is oriented such that its mold recess 12D opens toward the press 35 holding the molded cake substantially in a horizontal sense.

A slide needle bearing 36 is mounted on the base 37 by means of brackets 38, 39 and serves to support and guide feed rods 40 affixed endwise to the mounting plate 32 against downward flexing of the feed rods 40 when the lower cup 12B is moved toward the press 35 in response to actuation of the air cylinder 33.

For molding operation, the upper cup 12A is lowered by the air cylinder 15 and the lower cup 12B is moved back to the position shown in FIG. 5A with the air cylinder 33 fully retracted, thus providing the assembled block assembly 12 as shown in FIG. 4A. While a mass of synthetic resin is being molded in the mold cavity 17, the upper cup 12A is heated to 100° C.±20° C. by a heater 12I, preferably an electric heater, fastened thereto, and the lower cup 12B is heated 100° C.±20° C. by a heater 12J, also preferably an electric heater, supported on the extruder 7 and normally biased by a spring 12K to be held against the lower cup 12B. The lower cup 12B can be brought into contact with the heater 12J only when the lower cup 12B is returned to the position of FIG. 5A. The heating of the block assembly 12 has several advantages. Disc cakes molded by the heated block assembly 12 can have a smooth and uniform surface that prevents fabricated discs from getting defective or having rough surfaces. The temperature of the cakes becomes uniform throughout the surfaces. The cakes as molded are relatively soft, facilitating subsequent fabrication processes. The uniform temperature and softness of the discs result in smaller out-of-roundness distortions of signals recorded as a track of pits pressed on finished discs.

After one cycle of molding operation is over, the upper cup 12A is lifted by the air cylinder 15 to the position illustrated in FIG. 5A, whereupon the circular plate 13 is returned toward the first opening 16A. At this time, a disc cake molded by the block assembly 12 is retained solely by the lower cup 12B. Then, the mounting plate 32 is moved foward to cause the lower cup 12B to move angularly substantially through 90 degrees to keep the disc cake horizontally while the latter is approaching the press 35.

The press 35 will now be described in detail with reference to FIGS. 2B and 7. The press 35 comprises a base or standard 41 supporting thereon a fluid-pressure actuator or a fluid cylinder 42 such as a hydraulic cylinder on which there is mounted a mounting plate 44 supporting guide posts 45 extending upwardly. A movable bed 46 is slidably supported on the guide posts 45 for movement upwardly toward a fixed frame 47 secured to upper ends of the guide posts 45. A pair of lower and upper press dies 48, 49 are mounted respectively on the movable bed 46 and the fixed frame 47 in vertically confronting relation to each other. Each of the lower and upper press dies 48, 49 is circular in shape and is equipped on its flat surface a stamper or negative (not shown) for pressing video and audio information as pits into one of the surfaces of a disc cake as the latter is formed into a disc blank.

Figure 7:
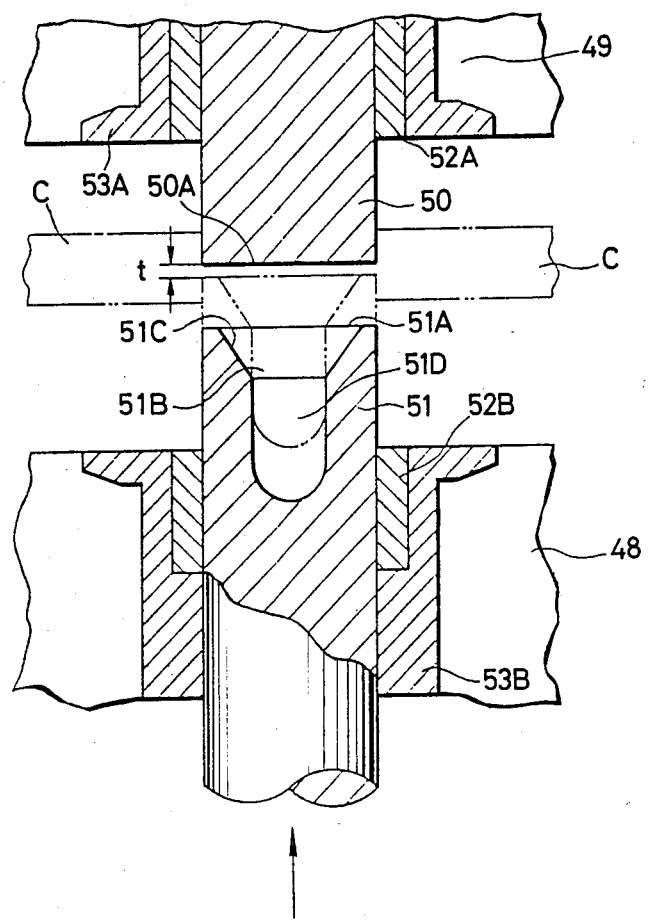
FIG. 7 is an enlarged longitudinal cross-sectional view of upper and lower centering pins in a press for pressing a cake into an information storage medium or disc blank.

A disc cake which has been transferred from the block assembly 12 into the press 35 is held in position between the press dies 48, 49 by a pair of upper and lower centering pins 50, 51 axially reciprocably mounted on the fixed frame 47 and the movable bed 46, respectively, and projecting retractably through the upper and lower press dies 49, 48, respectively, in coaxial alignment, as best shown in FIG. 7. The upper centering pin 50 is slidably supported in a bushing 52A retained in a hollow shaft 53A disposed in the upper press die 49 and has a substantially flat end face 50A facing downwardly the lower centering pin 51. The lower centering pin 51 is also slidably supported in a bushing 52B retained in a hollow shaft 53B disposed in the lower press die 48. The lower centering pin 51 has an end face 51A confronting the upper centering pin 50, there being a recess 51B defined centrally in the pin 51 and opening toward the upper centering pin 50. The central recess 51B includes a conical taper portion 51C extending from the end face 51A and a cylindrical portion 51D extending from the conical taper portion 51C away from the end face 51A, the cylindrical portion 51D being smaller in diameter than the end face 51A and contiguous to a smaller-diameter end of the conical taper portion 51C.

During pressing operation, the disc cake, disignated at C in FIG. 7, can easily be held suspended in position between the upper and lower press dies 49, 48. With the partially conical recess 51B in its end face 51A, the lower centering pin 51 has a relatively small area of contact with the upper centering pin 50, and hence can easily be thrust into the disc cake C against the upper centering pin 50 as the lower press die 48 is raised toward the upper press die 49 by the hydraulic cylinder 42. When the disc cake C is completely pressed by the press dies 48, 49, the centering pins 50, 51 are brought into contact endwise with each other, defining a small-diameter central hole through a pressed disc blank. The ease with which the disc cake C can centrally be pierced with the centering pins 50, 51 permits the lower centering pin 51 to be driven upwardly under a smaller force, thereby reducing an impact upon the disc cake when the latter is punched. Such facilitated punching is advantageous in that the disc cake which is of a relatively hard material, that is, vinyl chloride mixed with carbon, would likely be adversely affected when hit under increased impact pressure. In addition, where the force with which the lower centering pin 51 impinges upon the upper centering pin 50 is relatively small, the centering pins 50, 51 will have a prolonged service life. Since the recess 51B has its lower end closed, no material is allowed to flow downwardly along the lower centering pin 51 past the lower press die 48.

Just before the cake C is pressed by the press dies 48, 49, it is supported therebetween by the centering pins 50, 51 which are moved downwardly and upwardly, respectively, and thrust into the cake C leaving a thickness of material left therebetween. Then, the hydraulic cylinder 42 is actuated to press the cake C into a disc blank which contains a recorded region, an unrecorded region, and an overflow or flash that are contiguous to each other. The unrecorded region and overflow will later be trimmed off by a trimmer 54 (FIG. 2C), whereupon a disc composed of the recorded region will be produced.

Information storage mediums or video discs to which the present invention is mainly applicable are in the form of a flat circular plate having on its surfaces a multiplicity of pits or depressions along a spiral track with adjacent turns or convolutions spaced at a pitch of 1.35 $\mu$m, for example. Each pit has a width of 1.35 $\mu$m and a depth ranging from 0.3 $\mu$m to 0.4 $\mu$m. There is no guard band between adjacent track convolutions, so that the surfaces of the disc can provide as wide areas available for information writing as possible. A series of main pits pressed along the spiral track on the disc serve to carry three different signals frequency-modulated into a single carrier which include a video signal, and audio signals having two channels. Another series of pits which are positioned between adjacent track convolutions or turns have a width in the range of from 0.6 $\mu$m to 0.7 $\mu$m, the pits being centered at a boundary line between adjacent track convolutions, and a depth of 0.05 m. These secondary pits serving as auxiliary pits carrying a tracking signal have a sampling frequency of 15.74 KHz and are recorded on the disc surface in partially superimposed relation to the main pits of information signals at the horizontal synch pulses thereof. The auxiliary pits help a pickup needle trace the main pits along the spiral track on the disc which has flat surfaces having no groove to guide the needle. The tracking signal has three different frequencies, two of which are utilized to control the pickup needle to be positioned properly at all times, with the third frequency serving to detect each revolution of the disc. The disc rorates at 900 revolutions per minute according to NTSC system, and hence at 15 revolutions per second. Four fields or two frames are reproduced while the disc makes one revolution. Thus, four vertical synchronizing signals are recorded on the disc 90 degrees apart on each turn of the track. The disc has a diameter of 26 cm or 10.2 inches, and can record information or programs on its both surfaces as long as a total of two hours at most. The video disc contains information at an extremely high density as there are as many as 50,000,000,000 pits pressed on a single disc. The present invention is also applicable to other types of video disc such as those having needle guide groove.

Although the extremely high density of information written on the disc is advantageous, the high compactness is susceptible to defects such as physical distortions, scratches, unevenness or irregularities on the disc surfaces which could adversely affect reproduced forms of information such as pictures or sounds. The press dies 48, 49 according to the present invention are designed to eliminate such difficulties. Each of the press dies 48, 49 has a diameter of 30 cm or 12 inches which is larger than the final diameter of completed video discs, such that the disc blank contains the unrecorded region and overflow radially outward of the recorded region which is 26 cm or 10.2 inches across.

Figure 8A:
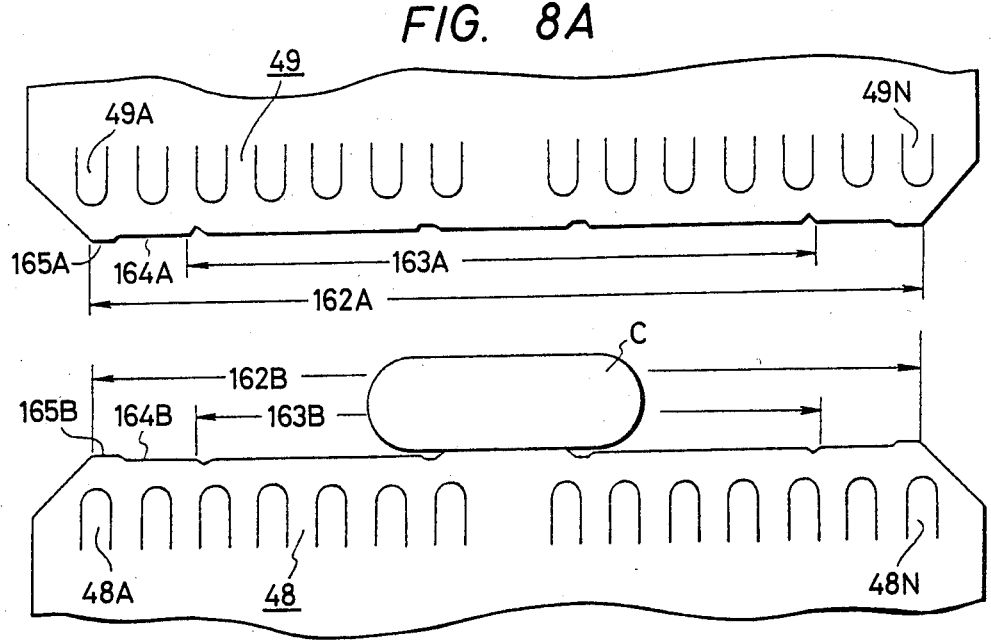
FIG. 8A is an enlarged side elevational view of upper and lower press dies.

More specifically, as shown in FIG. 8A, the upper and lower press dies 49, 48 have circular surfaces 162A, 162B, respectively, which are of a diameter of 30 cm and which include concentric circular areas 163A, 163B, respectively which have a diameter of 26 cm, the circular areas 163A, 163B serving to form the recorded region when the press dies 48, 49 come together. The circular surfaces 162A, 162B also include annular concentric areas 164A, 164B that are contiguous to the circular areas 163A, 163B, respectively, and which serve to produce the unrecorded region just outside the recorded region. The upper and lower press dies 49, 48 have grooves or channels 49A through 49N, 48A through 48N, respectively, for introducing steam and water alternately to heat and cool the press dies 49, 48, the channels 49A through 49N, 49A through 48N extending throughout the areas 163A, 164A, and 163B, 164B. The groove 49A, 49N and 48A, 48N extend radially outwardly of the areas 164A, 164B, respectively.

The press dies 48, 49 are first heated to a predetermined temperature by introducing steam into the 48A—channels 48N, and 49A–49N, and then the disc cake C is placed between the press dies 48, 49. The disc cake C is thereafter pressed by the heated press dies 48, 49 for about 20 seconds, after which the press dies 48, 49 are cooled down by passing water through the channels 48A–48N, 49A–49N. Thus, the disc cake C is heated uniformly by the heated press dies 48, 49 as the disc cake C is pressed into the disc blank. The recorded region of the disc blank is subjected to less distortions or flaws than the unrecorded region and the overflow are, since the circular areas 163A, 163B of the press dies 49, 48 are more uniformly heated than the annular areas 164A, 164B as the latter are heated and cooled later than the areas 163A, 163B and become uneven in temperature distribution. With the recorded region being substantially free from mechanical defects, no video or audio information contained therein in the form of depressions or pits is distorted or otherwise affected adversely for information.

Figure 8B:
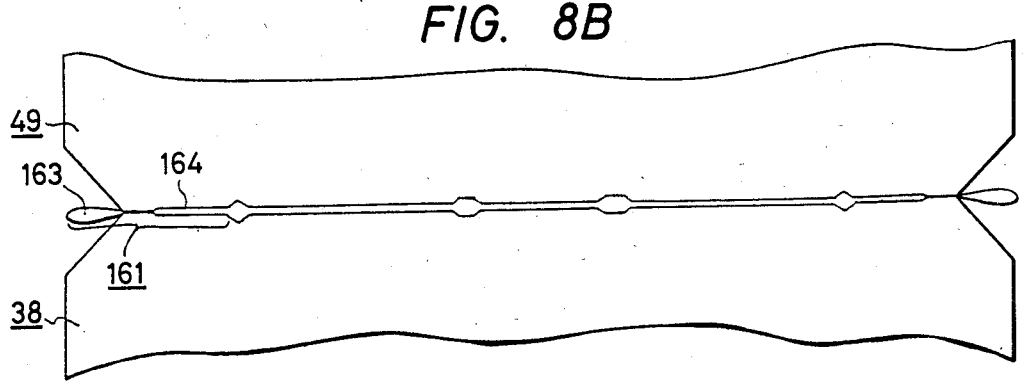
FIG. 8B is an enlarged side elevational view of the upper and lower press dies as they coact with each other to form a disc blank.
Figure 8C:
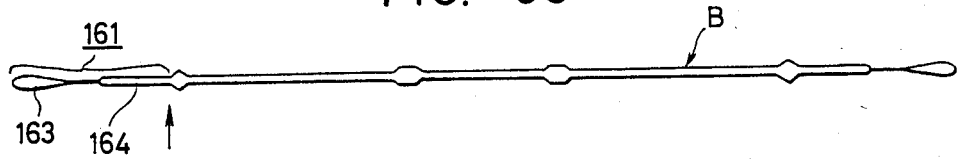
FIG. 8C is an enlarged side elevational view of the disc blank.
Figure 8D:
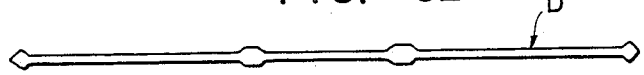
FIG. 8D is an enlarged side elevational view of a disc from which an unwanted unrecorded region and an overflow have been removed.

FIG. 8B shows a disc blank B formed by pressing the disc cake C shown in FIG. 8A between the press dies 48, 49, the disc blank having an unrecorded region 164 and an overflow 163 which are connected by a thin strip pressed between annular lands 165A, 165B (FIG. 8A) on the upper and lower press dies 49, 48, respectively. The unrecorded region 164 and the overflow 163 will later be cut off by the trimmer 54 as an annular scrap 161, thus leaving a disc D composed of a recorded region, as shown in FIG. 8D.

The trimmer 54 will now be described with reference to FIGS. 9A, 9B, 9C, and 9D.

The trimmer 54 comprises a base plate 55 having a roller bearing unit 56 in which there is mounted a vertical shaft 57 supporting thereon a turntable 58 with a turntable sheet 58A placed thereon. The shaft 57 has an axial bore through which extends a trimmer pin or spindle 65 passing through a central hole 58B on the turntable 58. The turntable 58 can be rotated by a gear motor 61 which is operatively coupled to the shaft 57 by means of a sprocket 59 mounted on the shaft 57 and another sprocket 60 mounted on the shaft of the gear motor 61, the sprockets 59, 60 being operatively connected to each other as by a drive chain (not shown). The gear motor 61 when energized rotates the turntable 58 at a rate of about 20 revolutions per minute. A trimmer mechanism includes a cutter blade 62 affixed to a cutter blade holder 63 which is mounted on the base plate 55 and movable gradually upwardly to cause the cutter blade 62 to pass upwardly by moving upwardly across the edge of the turntable 58 until the cutter blade 62 trims off a disc blank placed on the turntable 58. An annular scrap cut off the disc blank will drop into a scrap receiver 64.

Figure 9A:
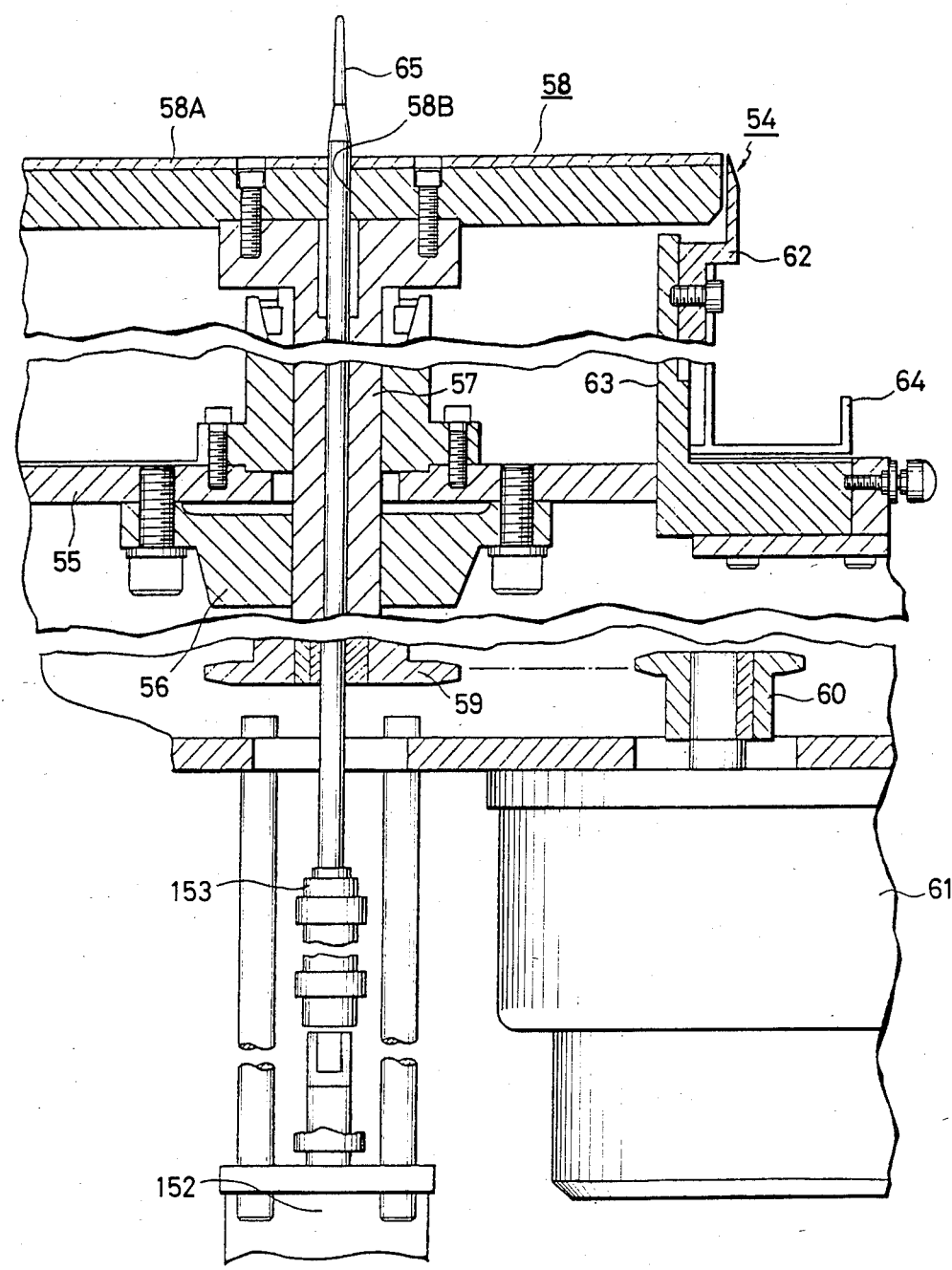
FIG. 9A is a vertical cross-sectional view of a trimming mechanism.
Figure 9B:
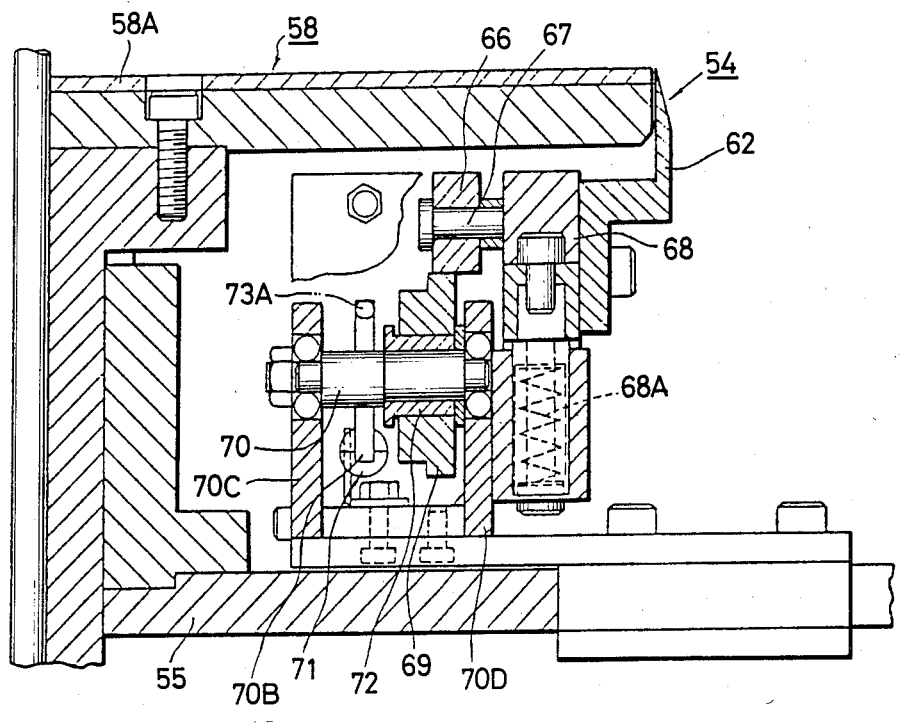
FIG. 9B is a vertical cross-sectional view of the trimming mechanism, showing a cutter blade driving assembly.
Figure 9C:
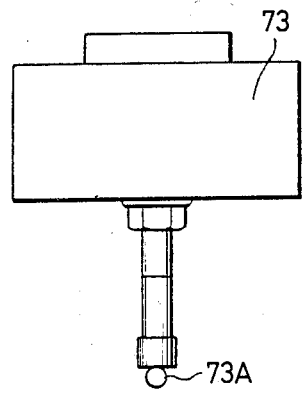
FIG. 9C is a plan view of a fluid-pressure actuator for actuating the cutter blade driving assembly shown in FIG. 9B.
Figure 9D:
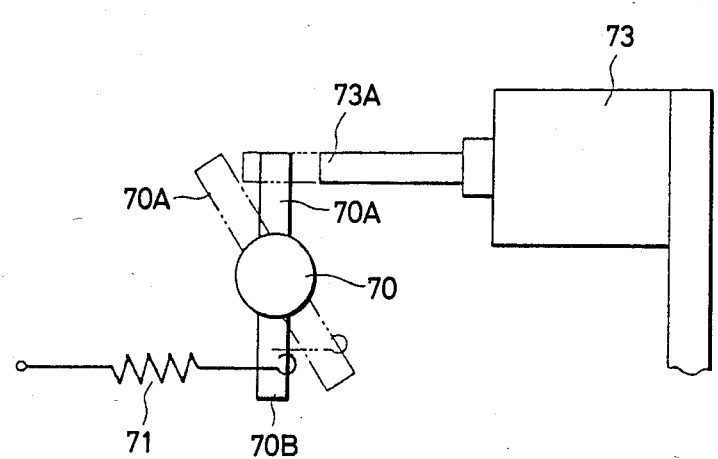
FIG. 9D is a front elevational view of a shaft in the cutter blade driving assembly, actuatable by the fluid-pressure actuator shown in FIG. 9C.
Figure 9G:
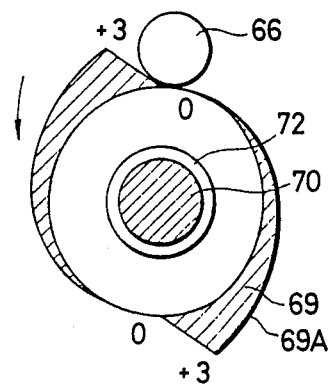
FIG. 9G is a front elevational view of a cam in the tramming mechanism illustrated in FIG. 9E.

As illustrated in FIGS. 9B, a roller follower 66 is rotatably mounted on a stud 67 fixed to the cutter blade holder 68. The roller follower 66 is held in abutting engagement with a cam 69 (FIG. 9G) mounted through a one-way or overrunning clutch 72 on a shaft 70 rotatably supported by a pair of brackets 70C, 70D disposed on the base plate 55. The cutter blade holder 68 is normally biased by a spring 68A to move downwardly toward the base plate 55. As best illustrated in FIG. 9D, the shaft 70 has a pair of diametrically opposite bars 70A, 70B, and a tension spring 71 acts between the bar 70B and the base plate 55 to normally urge the shaft 70 to rotate in one direction. An air cylinder 73 which is mounted with respect to the base plate 55 has a piston rod 73A held in engagement with the bar 70A. When the air cylinder 73 is actuated to extend its piston rod 73A, the shaft 70 is caused to turn about its own axis in one direction such that the one-way clutch 72 enables the cam 69 to turn with the shaft 70. Since the cam 69 has a peripheral cam face 69A spaced from said shaft 70 by a distance which gradually increases and then sharply decreases as the cam 69 rotates in said one direction, angular movement of the cam 69 causes the roller follower 66 engaging the peripheral cam face 69A to move gradually upwardly and then quickly downwardly, accompanying a similar movement of the cutter blade 62 which rises to pass by the edge of the turntable 58 and then returns to a starting or standby position. When the piston rod 73A is retracted, the shaft 70 is forced to turn in the opposite direction under the bias of the spring 71. At this time, however, the one-way clutch 72 allows the cam 69 to remain nonrotatable against angular movement with the shaft 70, so that the cutter blade 62 remains in the standby position. Repeated actuation of the air cylinder 73 thus moves the roller follower 66 and hence the cutter blade 62 upwardly intermittently. The air cylinder 73 is actuatable in synchronization with the motor 61 such that the cutter blade 62 will move upwardly by about 0.5 mm per revolution of the turntable 58. While the cam 69 is angularly moved through a range of 180 degrees, the cutter blade 62 is lifted 3 mm at maximum. Slow upward movement of the cutter blade 62 preferably at the disclosed rate is advantageous in that the cutter blade 62 can cut smoothly into the disc blank which is relatively hard because of carbon content without causing undesirable vibrations or shocks which would otherwise be detrimental to information-recorded region of the disc blank.

Figure 9H:
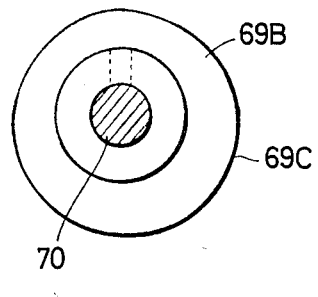
FIG. 9H is a front elevational view of a cam according to another embodiment.
Figure 9E:
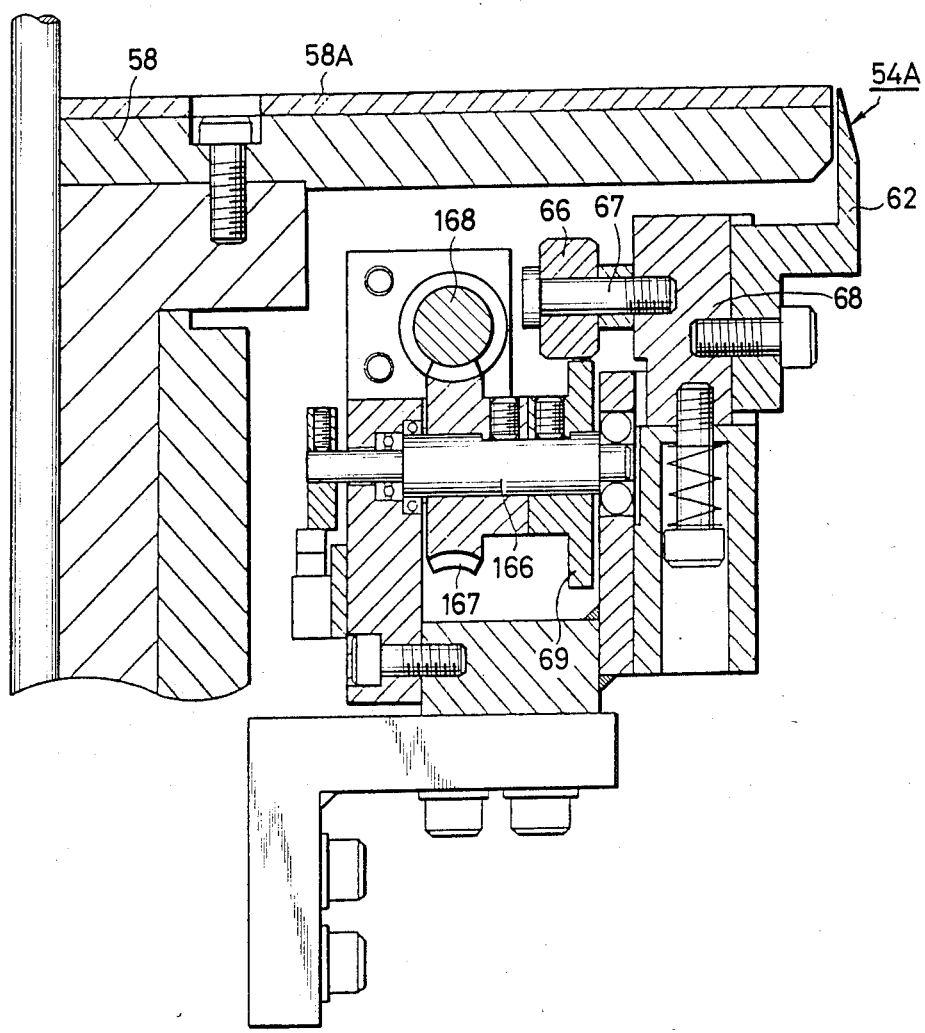
FIGS. 9E and 9F are vertical cross-sectional and plan views, respectively, of a trimming mechanism according to another embodiment.
Figure 9F:
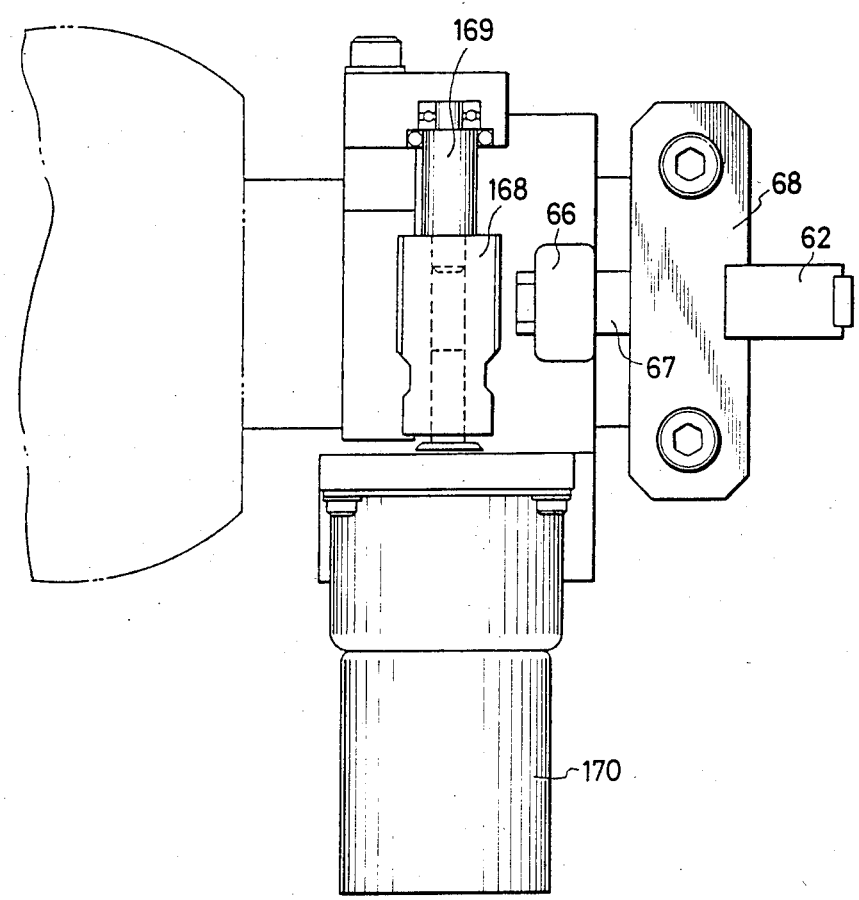

As shown in FIGS. 9E, 9F and 9H, a trimmer 54A according to another embodiment includes a worm gear 167 fixedly mounted as by a set screw on a shaft 166 and held in mesh with a worm 168 which is supported on a shaft 169 and drivable by a d.c. motor 170. The shaft 70 supports thereon a cam 69 (FIG. 9H), having a cam face 9C, fixed thereto as by a set screw for rotation therewith and held in abutment against a roller follower 66 rotatably mounted on a stud 67 secured to a cutter blade holder 68 to which a cutter blade 62 is fastened. When the motor 170 is energized, the cutter blade 62 is caused to ascend at a rate of about 0.5 mm per revolution of the turntable 58. Angular movement of the cam 69B through 180 degrees enables the cutter blade 62 to move slowly upwardly. The cutter blade 62 is then allowed to descend gradually in response to angular movement of the cam 69B through next 180 degree range.

The trimmer 54 or 54A also comprises a pressure table 74 (FIG. 10A) movable upwardly and downwardly and substantially coextensive with the turntable 58, the pressure table 74 having suckers 171 for picking up a disc away from the turntable 58 with a vacuum. An annular pusher 78 is provided around the pressure table 74 and is movable upwardly and downwardly by an air cylinder (not shown), the annular pusher 78 having an inside diameter which is slightly larger than that of the turntable 58. The annular pusher 78 supports a cutter blade 172 mounted thereon across its inner peripheral edge and extending downwardly toward the turntable 58 beyond a lower surface of the annular pusher 78 by a distance of about 0.5 mm. When a disc blank B on the turntable 58 is to be trimmed off, the pressure table 74 is first lowered coaxially with the turntable 58 until the pressure table 74 holds the disc blank B firmly against the turntable 58. Upon rotation of the pressure table 74 and the turntable 58, the annular pusher 78 is caused to descend to enable the cutter blade 172 to cut into the disc blank B along a circle having a diameter slightly larger than that of the recorded region of the disc blank B. At this time, the cutter blade 172 is not thrust into the disc blank B deeply enough to sever the unrecorded region and overflow off the recorded region of the disc blank B, as shown in FIG. 10C. Then, the annular pusher 78 is lifted clear from the disc blank B. The cutter blade 62 of the trimmer is now actuated to move upwardly gradually intermittently across the peripheral edge of the turntable 58 until the cutter blade 62 cuts off the unrecorded region and overflow from the recorded region of the disc blank B. The annular pusher 78 is again lowered to push the unrecorded region and overflow downwardly past the turntable 58 as an annular scrap, which will later will be chopped into pieces by a chopper mechanism.

Figure 2C:
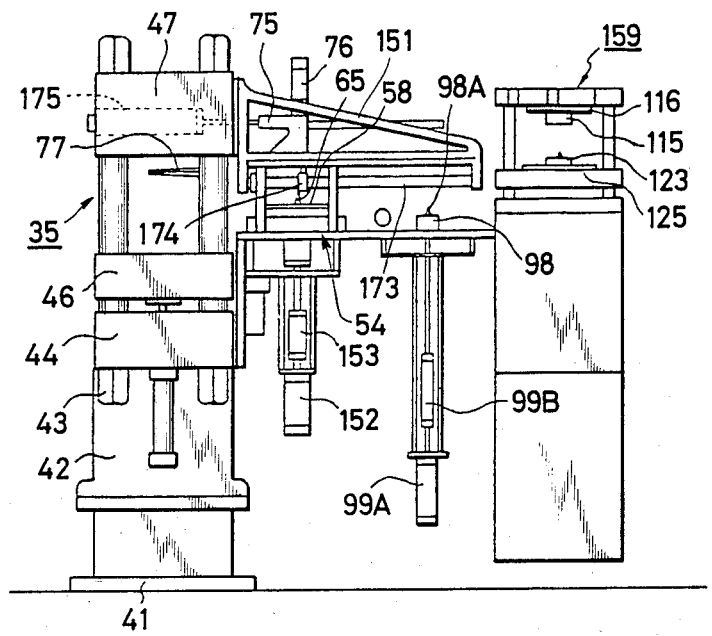

In FIGS. 2A and 2C, a main slide 75 is slidably supported on a guide rod 173 mounted on a frame 151 through a guide ring 174 attached to the main slide 75. The pressure table 74 is supported by and disposed downwardly of the main slide 75. The pressure table 74 is actuatable by an air cylinder 76 mounted on the main slide 75. A pair of spaced gripper arms 77, 77 extend from the main slide 75 in a direction substantially normal to the direction in which the disc cake is transferred from the cake molding machine to the press 35. The main slide 75 is movable along the guide rod 173 by an air cylinder 175 (FIG. 2C) housed in the fixed frame 47 of the press 35 to bring a disc blank gripped jointly by the gripper arms 77, 77 from the press 35 onto the turntable 58. Then, the main slide 75 moves back, and the air cylinder 76 is actuated to move the pressure table 74 downwardly to press the disc blank against the turntable 58 in a manner as described above. The gripper arms 77, 77 are of a length which is substantially equal to the distance between the geometrical centers of the press 35 and the trimmer 54 or 54A. The suckers 171 on the pressure table 74 serve to pick up a disc from which an annular scrap has been cut off and hold the disc until the main slide 75 as it moves along the guid rod 173 reaches a hot stamping machine 158.

The main slide 75 also has a support arm 79 extending remotely from the gripper arms 77, 77 for feeding a disc with an identification foil stamped thereon from the hot stamping machine 158 to a punching machine 159.

The support arm 79 has a length which is substantially the same as the distance between the centers of the trimmer 54 or 54A and the hot stamping machine 158 and also between the centers of the hot stamping machine 158 and the punching machine 158 along the direction of travel of discs.

As shown in FIGS. 2C and 9A, the spindle 65 is movable by a pair of air cylinders 152, 153 upwardly to a position in which the central hole in a disc blank fed by the gripper arms 77, 77 fits over the spindle 65. The disc blank can now be guided by the spindle 65 to fall by gravity onto the turntable 58.

Figure 10B:
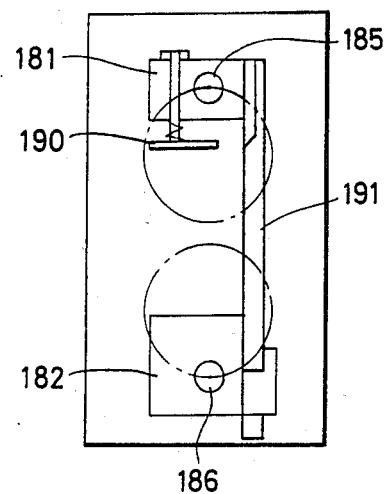
FIG. 10B is a front elevational view of upper and lower cutter blades of the chopper mechanism shown in FIG. 10A.
Figure 10C:
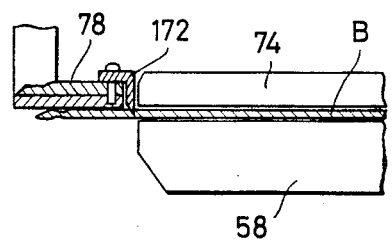
FIG. 10C is a cross-sectional view of a cutter mounted on an annular scrap pusher.
Figure 10D:
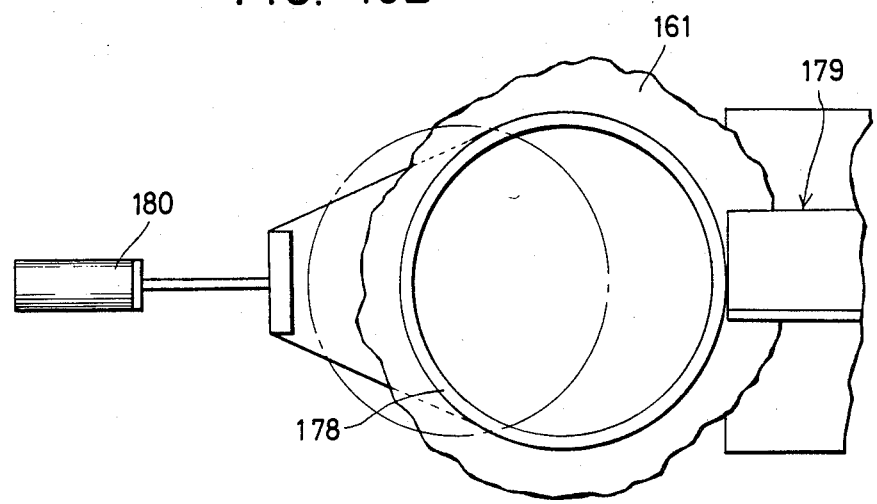
FIG. 10D is a plan view of the chopper mechanism illustrated in FIG. 10A as it operates to chop an annular scrap.

The annular scrap which has been trimmed off the disc will be cut into small pieces by a chopper mechanism 176 as shown in FIGS. 10A, 10B, 10D, and 10E. The chopper mechanism 176 comprises a base plate 177, a drum 178 slidably disposed on the base plate 177 below the turntable and having a diameter smaller than the turntable 58, a chopper 179 disposed adjacent to the base plate 177, and an air cylinder 180 mounted on the base plate 177 for moving the drum 178 toward the chopper 179. The annular scrap 161 as dropped past the turntable 58 is placed on the base plate 177 and extends around the drum 178. The chopper 179 comprises a pair of upper and lower cutter blades 181, 182, a pair of gears 183, 184 held in mesh with each other and supporting the upper and lower cutter blades 181, 182, respectively, through shafts 185, 186 attached at eccentric positions to the gears 183, 184 through bearings 187, 188, respectively. One of the gears 183 is coupled to an electric motor 189 so as to be driven thereby. The upper cutter blade 181 has a spring-biased scrap presser 190. The upper and lower cutter blades 181, 182 are operatively coupled to each other by guide bar 191 having an upper end affixed to the upper cutter blade 181, with a lower end portion of the bar 191 being slidably held by the lower cutter blade 182, as illustrated in FIG. 10B.

Figure 10E:
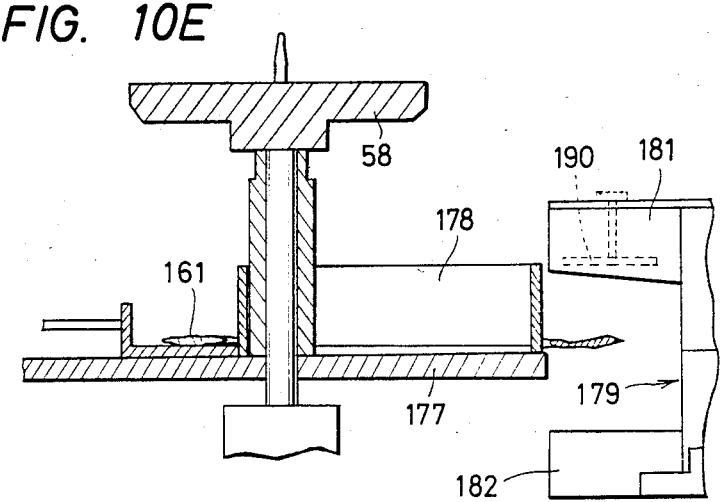
FIG. 10E is a vertical cross-sectiomnal view, with parts shown in elevation, of the chopper mechanism illustrated in FIG. 10D.
Figure 11A:
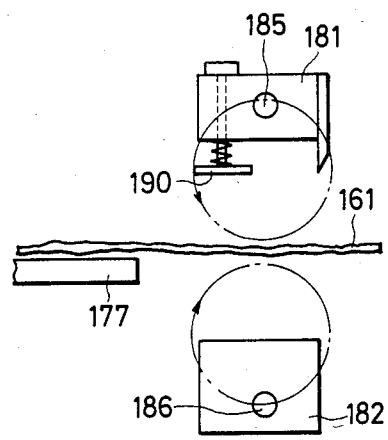
FIGS. 11A through 11D are front elevational views of the upper and lower cutter blades of the chopper mechanism, illustrative of progressive angular positions of the cutter blades for chopping the annular scrap into pieces.
Figure 11B:
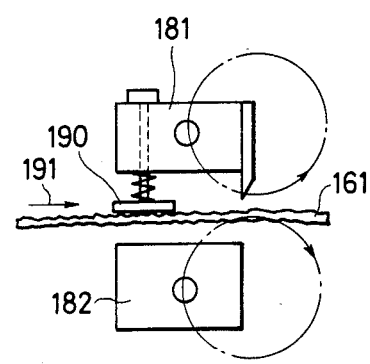
Figure 11C:
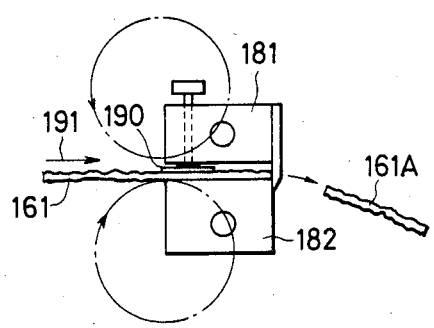
Figure 11D:
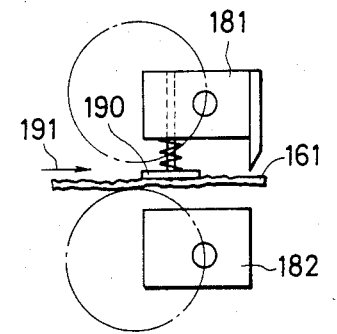

The chopper 179 will operate as follows: The air cylinder 180 is actuated to displace the annular scrap 161 partially between the upper and lower cutter blades 181, 182, as illustrated in FIG. 10E. When the motor 189 is energized, the gear 183, 184 rotate in opposite directions, and the upper and lower blades 181, 182 move toward each other as they revolve about the axes of the gears 183, 184 while maintaining their relative attitude with the guide bar 191, as shown in FIG. 11A. When the upper and lower cutter blades 181, 182 approach each other, the scrap presser 190 first comes into contact with the annular scrap 161. Continued revolution of the upper blade 181 causes the scrap presser 190 pushes the scrap 161 in the direction of the arrow 191 (FIG. 11B). The upper and lower cutter blades 181, 182 coact with each other to chop off a scrap piece 161A (FIG. 11C). The upper and lower blades 181, 182 now move away from each other as shown in FIG. 11D with the scrap presser 190 being still held against the scrap 161 to shift the latter in the direction of the arrow 191. The upper and lower cutter blades 181, 182 are continuously actuated to repeat cycles of cutting movement until the scrap 161 is fully chopped into pieces.

Figure 12:
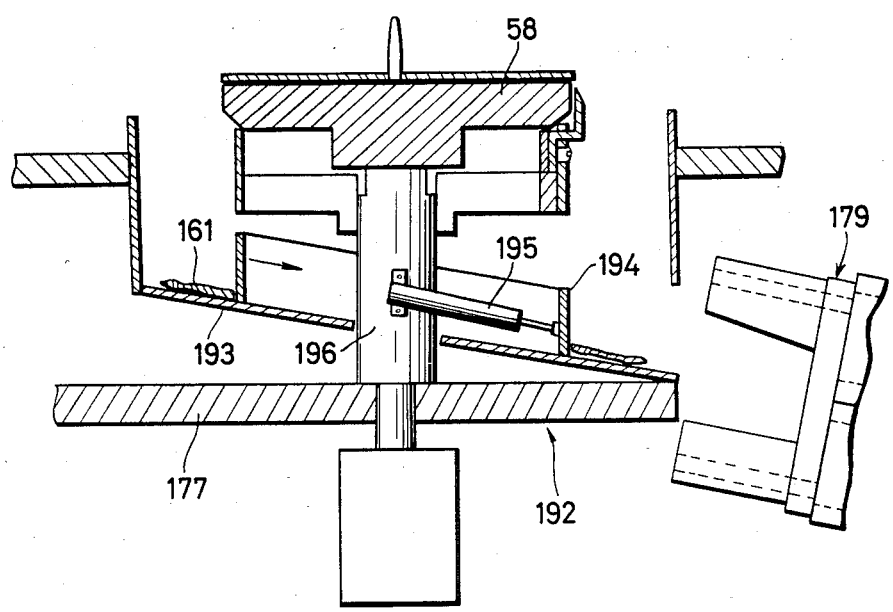
FIG. 12 is a vertical cross-sectional view, partly illustrated in elevation, of a chopper mechanism according to another embodiment.

FIG. 12 shows a chopper mechanism 192 according to another embodiment. The chopper mechanism 192 includes a guide plate 193 disposed over a base plate 177 and slanted downwardly toward a chopper 179 located adjacent to the base plate 177. A drum 194 is slidably disposed on the slanted guide plate 193 below the turntable 58. The drum 194 is movable down the guide plate 193 toward the chopper 179 by an air cylinder 195 which is operatively connected between the drum 194 and a column 196 on which the turntable 58 is supported. The inclined guide plate 193 allows the annular scrap 161 to slide down the guide plate 193 relatively smoothly toward the chopper 179 upon actuation of the air cylinder 195 to displace the drum 194 toward the chopper 179.

The hot stamping machine 158 will apply to a disc a foil piece serving as an identification enabling the user to tell one side of the disc from the other side thereof. The hot stamping machine 158 will be described with reference to FIGS. 2A, 2B, 2C, 13A, 13B and 14. A table 90 is slidably mounted on a pair of slide rails 92 which are affixed to a base plate 91. The table 90 has a central recess 93 and a plurality (three in the illustrated embodiment) of radial receiver arms 94A, 94B, and 94C angularly spaced at equal intervals. Each of the receiver arms 94A, 94B, and 94C has a slanted guide surface 94D flaring outwardly to permit a disc to be guided smoothly onto a table sheet 90A lying on the receiver arms 94A, 94B, and 94C and the table 90. A holder table 95 is movably supported on the base plate 91 and located centrally of the recess 93, the holder plate 95 having a central pin 96 projecting upwardly. The holder table 95 is movable vertically by a pair of air cylinders 99A, 99B (FIG. 2C) supported on the base plate 91.

Figure 13A:
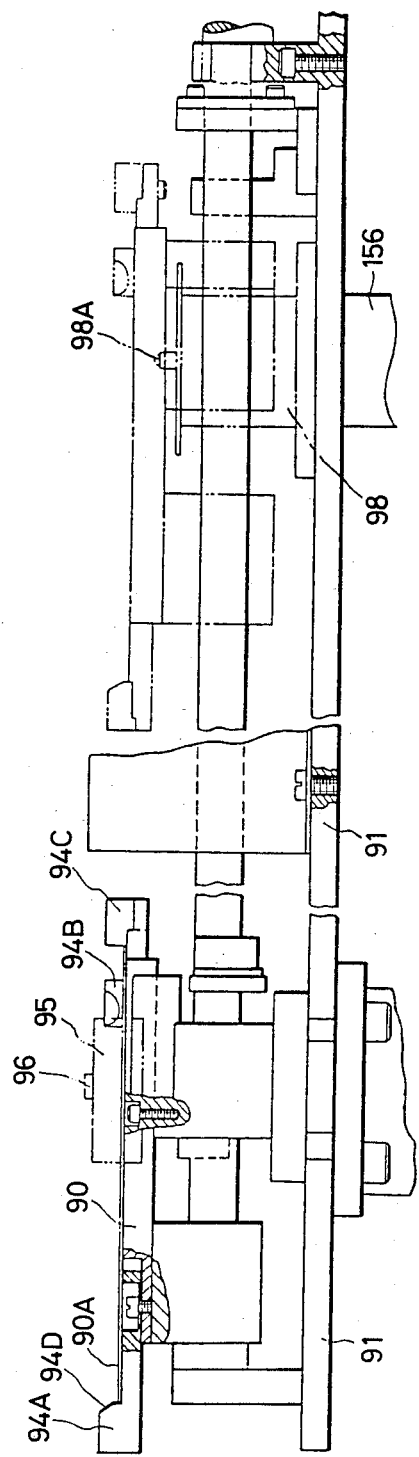
FIGS. 13A and 13B are side elevational and plan views, respectively, of a movable table structure of a hot stamping machine.
Figure 13B:
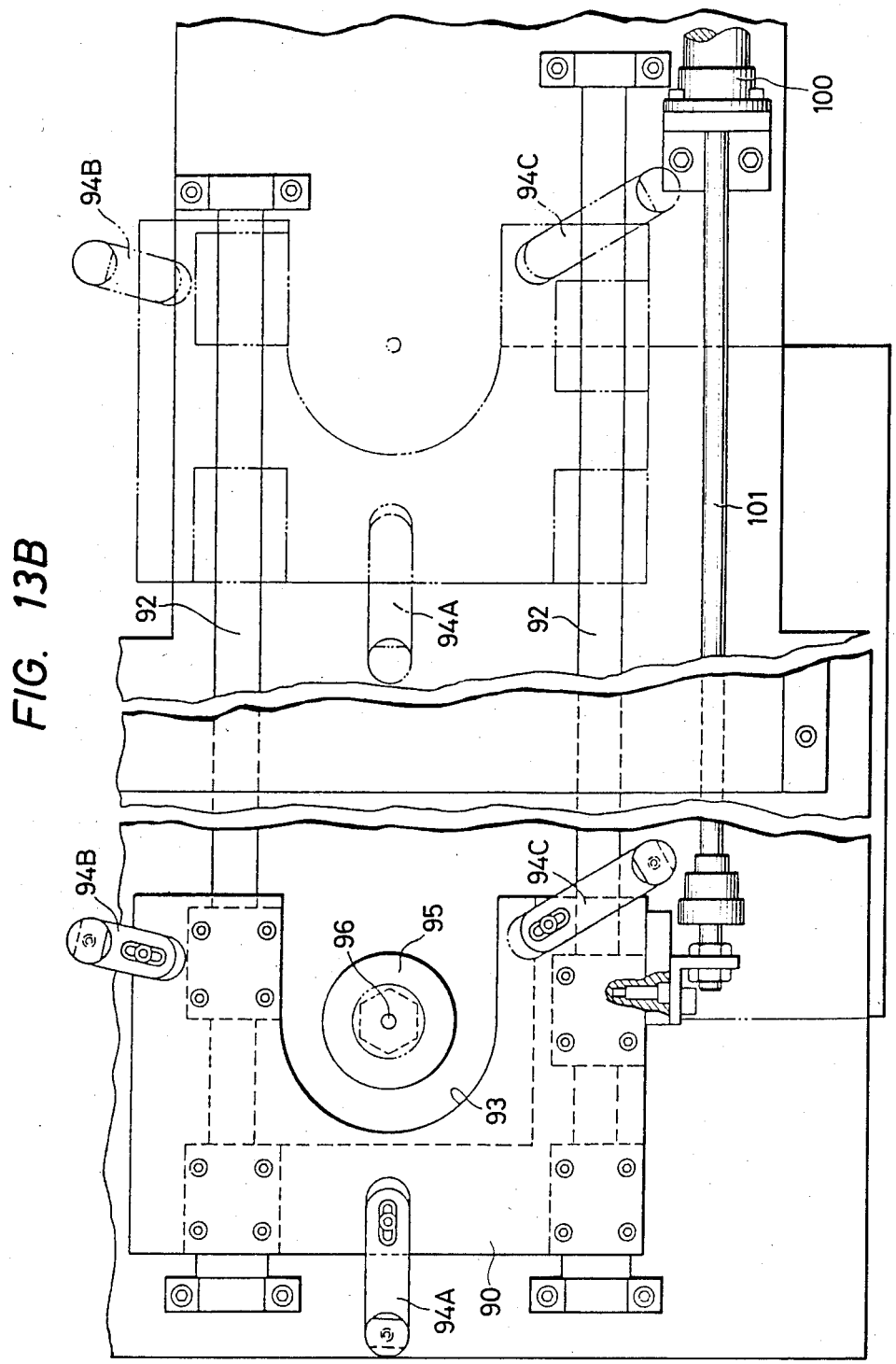
Figure 14:
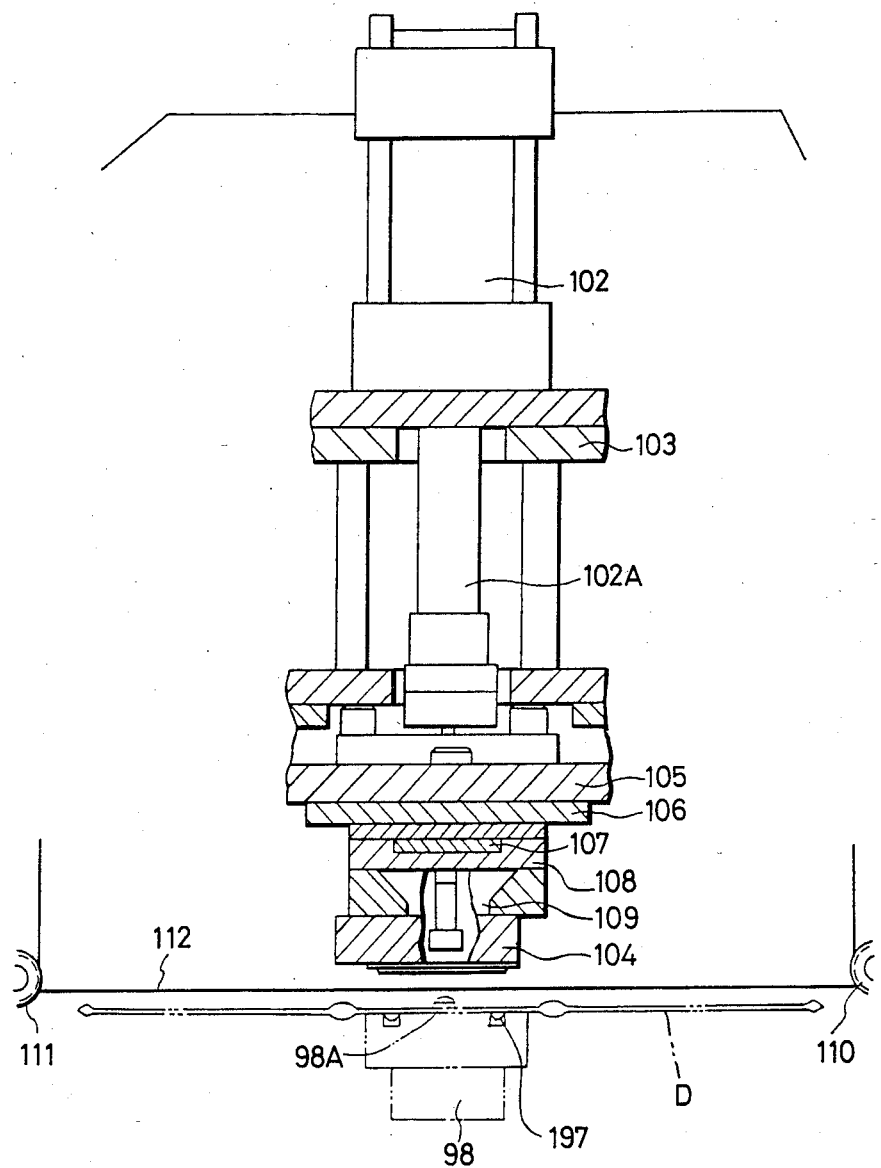
FIG. 14 is a vertical cross-sectional view of the hot stamping machine.

A lifter platter 98 is mounted on the base plate 91 and is actuatable vertically by an air cylinder 156 (FIG. 13A) supported on the base plate 91. The lifter table 98 has a central pin 98A which can fit into the central hole in a disc, and suckers 197 on its upper surface for holding the disc. An air cylinder 100 is mounted on the base plate 91 and has a piston rod 101 extending parallel to the slide rails 92 and connected at its distal end to the table 90, as shown in FIG. 13B. The table 90 is thus movable along the slide rails 92, 92 when the air cylinder 100 is actuated. The table 90 is shown by the solid lines in FIG. 13B in its first or advanced position which is substantially aligned with the support arm 79, and by the two-dot-and-dash lines in its second or retracted position in which the table 90 is aligned with the lifter platter 98 underlying a hot stamper 104 (FIG. 14) which is drivable by an air cylinder 102 mounted on an attachment plate 103. The air cylinder 102 has a piston rod 102A connected through a floating joint (not shown) to a slide plate 105 and a presser plate 106 fixed to the underside of the slide plate 105. The floating joint serving to cushion the hot stamper 104 when the latter impinges upon a disc placed on the lifter table 98 to apply a foil piece to the disc. Between the presser plate 106 and the hot stamper 104, there are interposed a heater 107, a heater holder 108, and a stamper holder 109 which are secured together. A film or foil 112 to be applied to a disc is fed from a supply reel (not illustrated) around a supply roller 110 from which the foil is delivered to pass between the hot stamper 104 and the disc on the lifter platter 98. The foil 112 can be wound around a takeup reel (not shown) via a takeup roller 111. The foil 112 can be stamped with heat by the hot stamper 104 as it moves downwardly onto a disc D supported on the table 98 as shown in FIG. 14.

Figure 15:
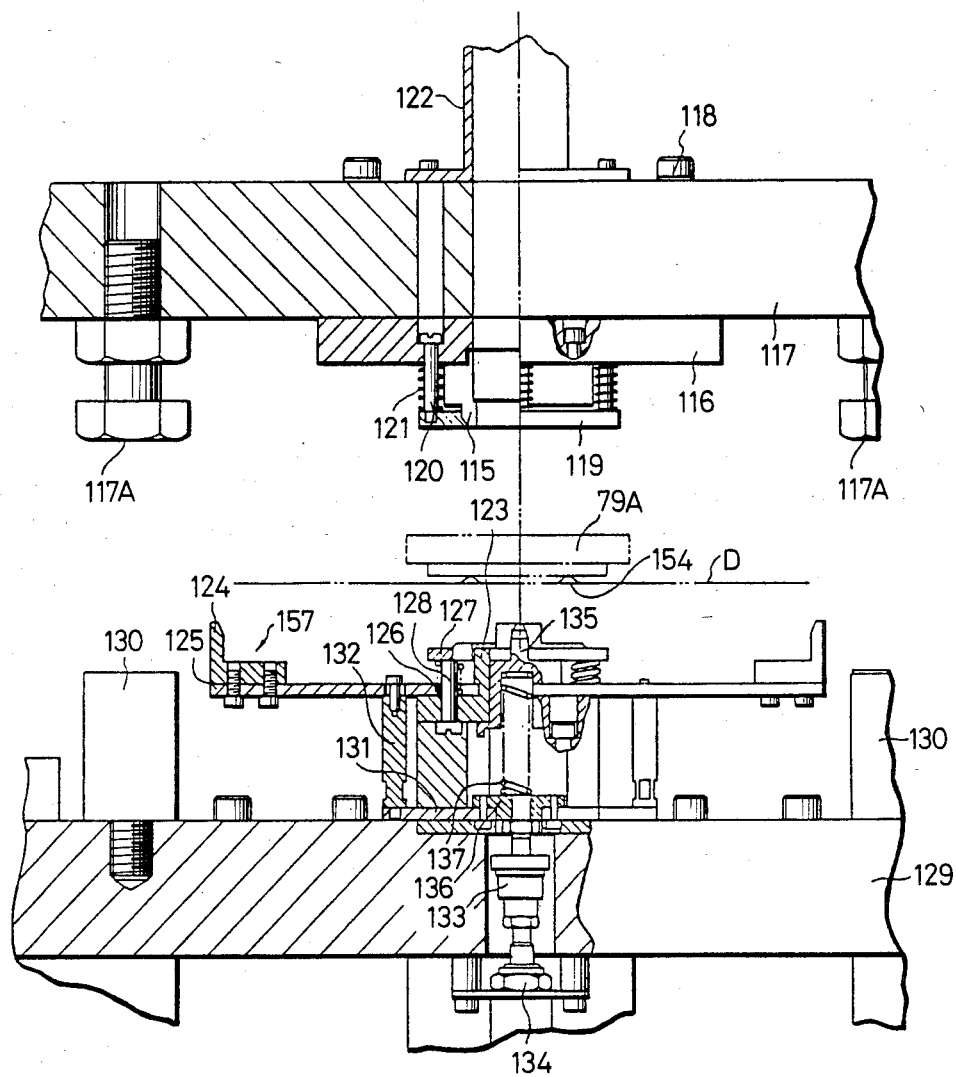
FIG. 15 is a side elevational view, partly shown in cross section, of a punching machine.

As shown in FIG. 15, the support arm 79 has on its distal end 79A suckers 154 which serve to hold the disc D while the latter is transferred from the hot stamping machine 158 to the punching machine 159. The punching machine 159 comprises an upper centering punch 115 mounted on an upper fixed frame 117 through a base plate 116 which is fastened to the upper fixed frame 117 by bolts 118. A disc pusher plate 119 is mounted on the base plate 116 by bolts 120 which are movably retained in the base plate 116. The disc pusher plate 119 is normally urged downwardly under the force of springs 121 disposed around the bolts 120, respectively, and acting between the base plate 116 and the disc pusher plate 119. The upper fixed frame 117 supports thereon a hollow cylinder 122 through which the debris punched out of the disc D can be discharged. The punching machine 159 also comprises a lower centering punch 123 mounted on a lower movable frame 129 which is movable upwardly and downwardly by a hydraulic cylinder (not illustrated), the lower centering punch 123 being concentric with the upper centering punch 115 so that they can coact with each other in defining a large-diameter central hole through the disc D. The lower movable plate 129 has studs 130 which are engageable with stops 117A mounted on the upper fixed plate 117 to prevent the lower movable plate 129 from moving upwardly when the studs 130 abut against the stops 117A. A centering table 157 includes a plurality of disc receivers 124 affixed to a disc receiver plate 125 which is connected to a floating joint 133 through support legs 132 and a support plate 131 coupled thereto, the floating joint 133 being coupled to an air cylinder 134. A lifter platter 127 is vertically movably mounted by bolts 128 on the lower centering punch 123 and is normally urged by compression coil springs 126 disposed around the bolts 128 to move upwardly beyond an upper edge of the lower centering punch 123. A central pin 135 is disposed centrally in the lower centering punch 123 and has a first conical taper portion at its distal end and a second conical taper portion extending therefrom and having a diameter larger than that of the first conical taper portion. The central pin 135 thus tapered can smoothly enter the central aperture which has been defined in the disc D in the press 35. The central pin 135 is normally biased upwardly by a compression coil spring 137 disposed therebeneath and acting against a spring seat 136 that is coupled to the floating joint 133.

As illustrated in FIG. 2A, the press 35, the trimmer 54 (54A), the hot stamping machine 158, and the punching machine 159 are located at stations X, Y, Z and W, respectively, which are spaced at equal intervals, each equal to the length of the gripper arms 77 or support arm 79. Therefore, a disc blank and discs supported by the gripper arms 77, the pressure table 75, and the support arm 79 can be carried simultaneously to the trimmer 54 (54A), the hot stamping machine 158, and the punching machine 159 upon movement of the main slide 75 through a single stroke in the direction of the arrow 198 (FIG. 2A). The disc blanks and discs stay momentarily at the stations X-W for the manufacturing process described later.

Figure 2D:
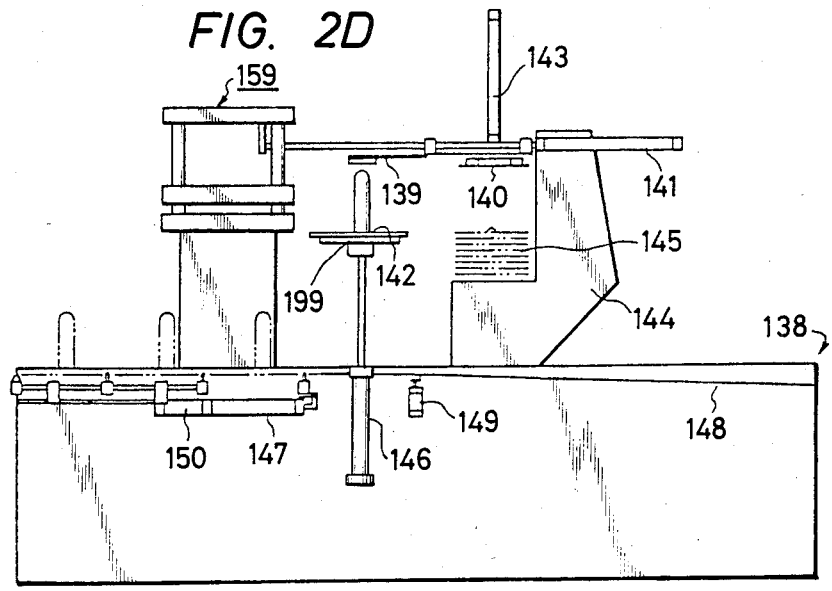

Discs D which are provided with large-diameter central holes by the punching machine 159 are finalized as finished video discs, which will then be stacked into groups by a stacker 138. As shown in FIG. 2D, the stacker 138 includes first and second pickup devices 139, 140 having suckers (not shown) and drivable by an air cylinder 141. The first pickup device 139 serves to pickup finished video discs one at a time from the punching machine 159, and bring the picked-up video disc over a pallet 142 that is placed on a support 199 elevated by an air cylinder 146 to a raised position. The second pickup device 140 can be lowered by an air cylinder 143 to pick up one at a time of partition plates 145 as stored on a partition plate storage unit 144, each time a predetermined number, five for example, of video discs are placed on the pallet 142 on the support 199. The picked-up partition plate 145 is carried by the second pickup device 140 over the pallet 142 upon actuation of the air cylinder 141, and is then allowed to drop off the second pickup device 140 onto the video discs stacked on the pallet 142. When a certain number, fifty for instance, of video discs are piled on the pallet 142, with partition plates 145 alternating with disc groups, the air cylinder 146 is actuated to lower the support 199 until the pallet 142 is put on a slant table 148, whereupon a first pallet pusher 147 is actuated to push the pallet 142 with the discs carried thereon beyond a stopper 149 down the slant table 148. Then a second pallet pusher 150 is operated to push an empty pallet onto the support 199 as lowered, and the air cylinder 146 is now actuated to raise the empty pallet for a next cycle of disc stacking operation.

Figure 4B:
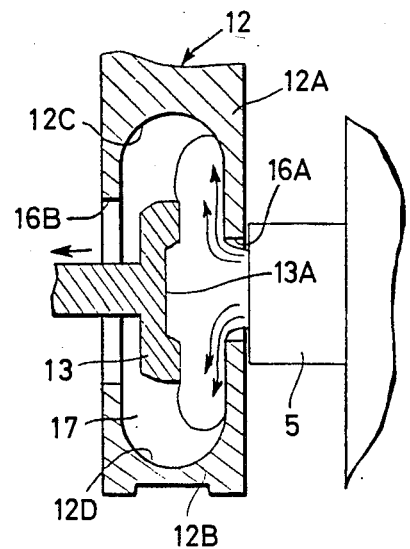
FIG. 4B is a fragmentary cross-sectional view of the cup assembly shown in FIG. 4A, illustrating the way in which a mass of synthetic resin material is forced to flow into the cup assembly to mold a disc cake.

The apparatus thus constructed will operate to fabricate video discs as follows:

When a main power supply switch of the apparatus is closed, a motor (not shown) is driven to rotate the screw 3 (FIG. 3) in the extruder 1 to knead the material to a viscosity suitable for molding video discs while the material is being heated up to a temperature of about 100° C. to 200° C. by steam passing through the passageways 7. Rotation of the screw 3 causes a mass of such material to be extruded through the nozzle hole 6 into the block assembly 12, as shown in FIG. 4B, through the opening 16A as the mass entering the mold cavity 17 pushes the plate 13 to the left toward the opening 16B. When the extruded mass enters the mold cavity 17, a tip of the mass is held in the recess 13A centrally in the mold cavity 17 at all times while the following material is forced to spread, as shown in FIG. 4B, outwardly into the recesses 12C, 12D in the mold cavity 17. As more and more of the mass of extruded material goes into the mold cavity 17, the plate 13 is finally fitted into the opening 16B, whereupon a limit switch (not shown) is closed to stop rotation of the screw 3 in the extruder 1, and the extruded mass is kept in the mold cavity 17 for a predetermined interval of time. The block assembly 12 is heated by the heaters 12I and 12J up to a temperature of about 100° C., so that the material molded in the block assembly 12 is rendered uniform on its surface as the material becomes solidified. The material is thus molded into a disc cake which has a shape complementary with the mold cavity 17.

Video discs of high quality require that disc cakes molded by the mold assembly 12 have smooth surfaces without bumps, bubbles, and cracks, and be heated uniformly throughout entire surfaces thereof. Conventional cake molding cups are generally in the form of a cylinder having flat top and bottom surfaces, a configuration which tends to produce bumps, air bubbles, cracks and other flaws and heat disc cakes unevenly. Air or gas is likely to be trapped in such defective portions in the disc cakes while the latter are being formed by prior cake molding cup assemblies. Such engulfed air or gas bubbles cause various flaws such as cracks, depressions, and swells to appear on the surface of the finished video disc. These defects adversely affect information-recorded pits when they are reproduced to the extent that a pickup needle can not track the pits properly. Such a difficulty will manifest itself particularly because the video disc contains a tremendous number of closely spaced pits. The known cake molding cup has also been disadvantageous in that a molded material is subjected to different temperatures around its periphery, a portion of the molded material which is first introduced and solidified is kept at a temperature different from that of other portions. Uneven temperatures of the disc cake have resulted in irregular thicknesses and distortions around the periphery of the finished disc. The distortions as they appear on the peripheral margin of a finalized video disc are not acceptable since they damage information recorded around the periphery of the video disc.

With the cake molding block assembly 12 as shown in FIGS. 4A and 4B, a tip of the extruded mass which is first introduced into the mold cavity 17 and is first solidified is brought into the recess 13A and kept therein centrally in the mold cavity 17 at all times throughout the molding operation. An end portion of the extruded material which finally enters the mold cavity 17 is also positioned centrally therein. The intermediate portion of the extruded mass is spread and distributed uniformly radially outwardly into the mold cavity 17. The cake molding block assembly 12 is heated to finish the cake surface neatly and smoothly, heat the cake evenly, and keep the cake relatively soft in preparation for transfer into the press 35. Thus, when the cake is pressed by the press 35 into a disc blank, the formed disc blank is substantially free from irregular thicknesses, bumps, distortions, air bubbles. The central portion of the disc blank which is composed of the tip of the extruded material that was first solidified, tends to contain dust particles and be thicker than the rest of the disc blank. However, such central portion will eventually be punched out by the punching machine 159.

When the cake as molded is solidified enough to retain its shape on its own, the upper block 12A is lifted by the air cylinder 15, whereupon a limit switch (not shown) is closed to actuate the air cylinder 160 to move the slide plate 27 for about 50 mm. Then, a limit switch (not shown) is turned on to actuate the air cylinder 33 to advance the mounting plate 32. The cam 31 is caused by the springs 25 to turn counterclockwise (FIG. 5A) as the cam 31 is moved out of engagement with the roller 30. At this time, the lower support 24 and hence the lower block 12B mounted thereon are also turned counterclockwise, with the cake being carried by the lower block 12B. Continued actuation of the air cylinder 33 moves the lower block 12B into the press 35 forward while the cake is maintained substantially horizontally.

When the cake C reaches the press 35, the upper and lower centering pins 50, 51 project downwardly and upwardly, respectively, into the cake C with a certain thickness of the cake material being left therebetween, as illustrated in FIG. 7. Upon holding of the cake C with the centering pins 50, 51, a switch (not shown) is actuated to contract the air cylinder 33, retracting the lower block 12B to the starting position shown in FIG. 5A. Thereafter, a non-illustrated limit switch is closed to actuate the hydraulic cylinder 42 to move the lower press die 48 upwardly until the upper and lower press dies 49, 48 which have been heated press the cake C therebetween into a disc blank. The disc blank thus formed is heated and pressed continuously for about 20 seconds, and subsequently cooled down for about 10 seconds. The upper and lower press dies 49, 48 are heated uniformly by steam flowing through the grooves 49A–49N, 48A–48N which extend radially outwardly beyond the areas 164A, 164B (FIG. 8A) that serve to form an unrecorded region of the disc blank. Any distortions that tend to be included in the disc blank when the latter is pressed appear only in such an unrecorded region 164 and an overflow 163 radially outward thereof, which will be trimmed off from the recorded region.

After one cycle of pressing operation is over, the hydraulic cylinder 42 is inactivated to lower the lower press die 48, whereupon the main slide 75 is moved along the guide rod 173 in response to actuation of a limit switch (not shown). Upon movement of the main slide 75, a limit switch (not illustrated) is closed to actuate the air cylinders 152, 153, 99A, and 134. The disc blank positioned in the press 35 is gripped by fingers (not shown) as closed of the gripper arms 77, 77 mounted on the main slide 75. The fingers of the gripper arms 77, 77 are closed about 5 seconds after the press dies 48, 49 have started being cooled.

The main slide 75 is moved forward in the direction of the arrow 198 (FIG. 2A) to transfer the disk blank into the trimmer 54 (54A). While the main slide 75 is being advanced, the lower block 12B with a next disc cake C carried thereby is brought into the press 35.

When the disc blank reaches the trimmer 54 (54A), the spindle 65 has already been raised to its upper position by the air cylinders 152, 153. The gripper arms 77, 77 are then inactivated to release the disc blank down onto the turntable 58 with the spindle 65 extending through a central aperture in the disc blank which has been formed by the centering pins 50, 51 in the press 35. The main slide 75 is now caused to return along the guide rod 173 toward the press 35, closing a limit switch (not shown) mounted on the frame 151 to contract the air cylinder 153 for lowering the spindle 65. At the same time, the fingers of the gripper arms 77 are closed to facilitate returning movement of the main slide 75. When the main slide 75 is returned, the gripper arms 77 are placed between the fixed frame 47 and the movable bed 46 of the press 35 so as to be ready for gripping a next disc blank.

Upon returning of the main slide 75, the air cylinder 76 is actuated to lower the pressure table 74 to press the disc blank B against the turntable 58. The gear motor 61 is energized to rotate the turntable shaft 57 through the sprockets 59, 60, thereby rotating the turntable 58. A timer switch (not illustrated) is then actuated to lower the annular pusher 78 to cause the cutter blade 172 to cut into the disc blank, and then to operate the air cylinder 73 (FIG. 9C) or the motor 170 (FIG. 9F) to turn the cam 69, whereupon the cutter blade 62 ascend gradually to cut off the unrecorded region and overflow of the disc blank which projects radially outwardly beyond the edge of the turntable 58. Gradual upward movement of the cutter blade 62 enables the latter to thrust smoothly into the disc blank which is relatively hard without causing the recorded region to undergo undue vibrations or shocks which would otherwise distort the recorded region. When the trimming is over, the cutting blade 62 descends in response to further rotation of the cam 69, with a disc D (FIG. 8D) left on the turntable 58. At this time, a next disc blank is formed in the press 35. Thereafter, the hydraulic cylinder 42 is contracted to lower the movable bed 46, whereupon a switch (not shown) is operated to actuate the suckers 171 on the pressure table 74 to hold the trimmed disc D. The spindle 65 is now moved downwardly. Therefore, the trimming operation is completed before the press 35 goes through one cycle of pressing operation to form a next disc blank from a disc cake fed from the cake molding machine.

While the trimming and pressing operations are being carried out, the annular scrap 161 which has been dropped by the annular pusher 78 (FIG. 10a) is chopped by the chopper mechanism 176 or 192 into pieces which are collected for reuse.

When the next disc blank is pressed, it is gripped by the fingers of the gripper arms 77, 77, and is transferred over the trimmer 54 or 54A in response to advancing movement of the main slide 75. At the same time, the pressure table 74 mounted on the main slide 75 carries the trimmed disc away from the trimmer 54 or 54A toward the hot stamping machine 158. A predetermined time after the first trimmed disc has been fed by the main slide 75 to the position Z, a timer switch (not illustrated) is actuated to operate the air cylinders 99A, 99B, 152, and 153 for raising the spindle 65 and the holder table 95. The first trimmed disc and the next disc blank are fitted over the central pin 96 and the spindle 65, respectively, and fall onto the table 95 and the turntable 58, respectively. Upon arrival of the first disc at a position over the holder table 95, the disc is released of the suckers 171 on the pressure table 74 and placed onto the holder table 95, whereupon the main slide 75 is moved back for allowing the pressure table 74 to descend against the next disc blank put on the turntable 58 for trimming operation. When the main slide 75 is to be returned, the holder table 95 and the spindle 65 have already been moved down clear out of the path of movement of the main slide 75. After such trimming operation has been effected, the trimmed disc is lifted again by the suckers 171 on the pressure table 74 in a manner described above. The air cylinders 99A, 99B are actuated to move the holder table 95 downwardly to a position below the table 90, placing the disc on the receiver arms 94A-94C on the table 90. Thereafter, the cylinder 100 is put into operation to cause the table 90 to slide over the holder table 95 as lowered therebelow along the slide rails 92 toward the lifter platter 98. When the table 90 reaches a position directly above the lifter platter 98, which is in its lower position, a limit switch (not shown) is turned on to actuate the air cylinder 156 for raising the lifter platter 98 until the latter carries the disc D upwardly off the receiver arms 94A-94C. Then, the air cylinder 102 is actuated to cause the hot stamper 104 as heated to be lowered and stamp a foil piece out of the foil 112 and press such a foil piece against the disc D for a predetermined period of time. After the foil piece has been applied to the disc D, a timer switch (not shown) is actuated to cause the air cylinder 102 to move the hot stamper 104 upwardly. Subsequently, the lifter table 98 is lowered by the air cylinder 156 as the disc D retained on the table 98 by the suckers 197 is separated from the foil 112. Downward movement of lifter table 98 permits the disc D with the foil piece stamped to be placed on the receiver arms 94A-94C, and then the air cylinder 100 is actuated again to move back the table 90 toward the position Z (FIG. 2A) or the solid-line position shown in FIG. 13B. When the table 90 reaches the position Z, a limit switch (not shown) is turned on to actuate the air cylinders 99A, 99B to move the holder table 95 upwardly until the holder table 95 lifts the disc D off the receiver arms 94A-94C up to position immediately below the suckers 154 on the end 79A of the support arm 79.

A non-illustrated timer switch is actuated to cause the suckers 154 to pick up the disc D. Then, another timer switch is turned on to actuate the air cylinders 99A, 99B to lower the holder table 95 out of the path of travel of the main slide 75 toward the punching machine 159. The hot stamping operation as described above is completed in one cycle of operation of the press 35. At this time, the next disc D which has been trimmed by the trimmer 54 (54A) is held on the pressure table 74 by the suckers 171 so as to be preparatory for transfer to the hot stamping machine 158.

With the first and second discs D carried by the support arm 79 and the pressure table 74, respectively, ready for next processing steps, a third disc blank which has been pressed by the press 35 is gripped by the gripper arms 77, 77 in the manner as mentioned above. Actuation of the hydraulic cylinder 42 to lower the lower press die 48 causes the associated limit switch to enable the main slide 75 to slide forward, bringing the first disc D, the second disc D, and the third disc blank B to be positions W, Z and X, respectively. The second disc D and the third disc blank B will be processed in the foregoing manner.

When the disc D carried by the support arm 79 arrives at the position W, the air cylinder 134 is actuated by the associated limit switch to raise the centering table 157 to a position beneath the disc D retained by the suckers 154 on the support arm 79. Upward movement of the centering table 157 actuates a timer switch (not shown), which inactivates the suckers 154 to release the disc D onto disc receivers 124, whereupon the air cylinder 134 is actuated again to move the centering table 157 downwardly. The main slide 75 now returns to the position shown by the solid lines in FIG. 2A to pick up subsequent discs and a disc blank. The main slide 75 is moved to the punching machine 159 and returned back to the initial position before the hot stamping and trimming processes are over.

The lower frame 129 is raised by the hydraulic cylinder (not shown) toward the upper frame 117 until the studs 130 abut against the stops 117A, whereupon the upper and lower centering punches 115, 123 coact with each other to define a large-diameter central hole through the disc D supported on the disc receivers 124. After the large-diameter central hole has been formed in the disc D, the hydraulic cylinder is actuated again to move the lower frame 129, whereupon the disc D is placed on the lifter plate 127. Descending movement of the lower frame 129 actuates a limit switch (not shown) which enables the air cylinder 141 (FIG. 2D) to operate. Operation of the air cylinder 141 in turn actuates a switch (not shown) to activate the air cylinder 134 for raising the centering table 157 from the lowered position.

Actuation of the air cylinder 141 continues until the first pickup device 139 comes over the disc D supported on the centering table 157. Then, the sucker on the first pickup device 139 is actuated to attract the disc D away from the centering table 157, whereupon the air cylinder 134 is operated to lower the centering table 157. When the first pickup device 139 picks up the disc D, a switch (not shown) is turned on to actuate the air cylinder 141 again to retract the first pickup device 139 away from the punching machine 159. When the disc D is brought to a position above the pallet 142 placed on the support 199 as it is in its raised position, the first pickup device 139 releases the disc D to fall onto the pallet 142. After five such discs D have been stacked on the pallet 142, the air cylinder 143 is actuated to lower the second pickup device 140 to pick up one of partition plates 145. When the first pickup device 139 moves toward the punching machine 159 to pick up the sixth disc D, the second pickup device 140 with the partition plate 145 held thereon is moved therewith toward the position over the pallet 142. At the same time as that the first pickup device 139 picks up the sixth disc D, the second pickup device 140 releases the partition plate 145 to drop onto the five discs D piled up on the pallet 142.

The foregoing cycle of operation is repeated until a total of fifty discs D are stacked on the pallet 142 with every five discs D alternating with partition plates 145. Then, a non-illustrated relay is energized to actuate the air cylinder 146 to lower the pallet 142 with the piled discs thereon. When the pallet 142 is lowered onto an upper surface of the slanted table 148, a switch (not shown) is turned on to enable the first pallet pusher 147 to push the pallet 142 loaded with the five discs D down the slanted table 148. The loaded pallet 142 is discharged from the slanted table 148 into a stocker or storage unit 138. At the same time, the second pallet pusher 150 is actuated to move a next empty pallet onto the support 199, which is in turn lifted by the air cylinder 146 up to the elevated position.

Although certain preferred embodiments have been shown and described in detail, it should be understood that many changes and modifications may be made therein without departing from the scope of the appended claims. For example, the cake molding block assembly 12 may be arranged to lie horizontally, and the extruder nozzle 5 may be directed upwardly to extrude a mass of material into the block assembly 12 from below. The extruder 1 may be directed in alignment with the press 35 so that cakes and disc blanks can be fed along a straight-line path of travel for applications in which no wide space is available except for a narrow long installation space.

What is claimed is:

1. A method of manufacturing information storage medium blanks, comprising the steps of:
   (a) extruding a mass of electrically conductive synthetic resin through a nozzle;
   (b) molding the extruded mass into a cake in a molding means having a moldable plate mounted on a piston rod of a piston and cylinder assembly, the plate having a surface confronting the nozzle and having a central recess in said surface, the molding step including catching a tip of the extruded mass in said recess and allowing said plate to be retracted away from said nozzle by the extruded mass being discharged from said nozzle with the piston rod slidably moved into a cylinder of said piston and cylinder assembly, while permitting the extruded mass to be expanded radially outwardly with said tip centrally contained in a core portion of said cake;
   (c) carrying said cake from said molding means;
   (d) pressing said cake in a press into an information storage medium blank including a recorded region and an overflow;
   (e) transferring said information storage medium blank from said press;
   (f) trimming said information storage medium blank to cut said overflow off said recorded region as a scrap, to thereby form an information storage medium composed of said recorded region; and (g) punching out said core portion from said information storage medium.

2. A method according to claim 1, wherein said molding means has a portion movable into said press while carrying said cake.

3. A method according to claim 1, including the steps of holding and piercing said cake centrally thereof with a pair of opposite centering pins moving toward each other from a pair of press dies, respectively, in a position between said press dies and out of contact with said press dies while leaving a thickness of said cake between said centering pins, moving said press dies toward each other to press said cake therebetween into said information storage medium blank while causing said centering pins to penetrate said cake, and alternately heating and cooling said press dies when said cake is pressed into said information storage medium blank.

4. A method according to claim 1, wherein said scrap is cut off said recorded region by a nonrotatable cutter blade movable gradually upward across the periphery of a turntable on which said information storage medium blank is supported, while said information storage medium blank is being rotated on and with said turntable, further including the steps of holding said information storage medium blank against said turntable, and pushing said scrap off said recorded region past said turntable.

5. A method according to claim 4, including the step of cutting into said information storage medium blank on said turntable at the periphery thereof by a second cutter blade, said first-mentioned cutter blade and said second cutter blade cutting into opposite surfaces of said information storage medium blank in opposite directions.

6. A method according to claim 4, including the steps of dropping said scrap onto a surface extending substantially parallel to said turntable, displacing said scrap out of alignment with said turntable along said surface, and thereafter chopping said scrap into pieces.

7. A method according to claim 6, wherein said scrap is annular in shape and chopped as it rotates about its own axis.

8. A method according to claim 1, including the steps of stamping an identification foil piece with heat onto the information storage medium, defining a central hole through said information storage medium with the identification foil piece attached thereto, and stacking said information storage medium having the central hole.

* * * * *